United States Patent
Nam et al.

(10) Patent No.: US 12,273,292 B2
(45) Date of Patent: Apr. 8, 2025

(54) TECHNIQUES FOR PROVIDING UE-ASSISTANCE FOR A SELECTION OF A DEMODULATION REFERENCE SIGNAL PORT MULTIPLEXING PATTERN

(71) Applicant: QUALCOMM Incorporated, San Diego, CA (US)

(72) Inventors: Wooseok Nam, San Diego, CA (US); Xiaoxia Zhang, San Diego, CA (US); Ahmed Abdelaziz Ibrahim Abdelaziz Zewail, San Diego, CA (US); Zhifei Fan, San Diego, CA (US); Tao Luo, San Diego, CA (US); Jing Sun, San Diego, CA (US); Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 604 days.

(21) Appl. No.: 17/575,363

(22) Filed: Jan. 13, 2022

(65) Prior Publication Data

US 2022/0224483 A1    Jul. 14, 2022

Related U.S. Application Data

(60) Provisional application No. 63/137,616, filed on Jan. 14, 2021.

(51) Int. Cl.
*H04L 5/00* (2006.01)
*H04J 13/16* (2011.01)

(52) U.S. Cl.
CPC ............ *H04L 5/0051* (2013.01); *H04J 13/16* (2013.01); *H04L 5/006* (2013.01)

(58) Field of Classification Search
CPC ........ H04L 5/0051; H04L 5/006; H04J 13/16; H04J 2011/0006; H04J 2011/0009; H04J 11/00
See application file for complete search history.

(56) References Cited

U.S. PATENT DOCUMENTS

| | | | | |
|---|---|---|---|---|
| 2018/0062811 A1* | 3/2018 | Akkarakaran | ........ | H04L 5/0007 |
| 2018/0160404 A1* | 6/2018 | Im | ......................... | H04L 5/0048 |
| 2024/0260043 A1* | 8/2024 | Bala | ....................... | G06Q 20/36 |

* cited by examiner

*Primary Examiner* — Eric Myers
(74) *Attorney, Agent, or Firm* — Holland & Hart LLP

(57) ABSTRACT

Methods, systems, and devices for wireless communications are described. In some systems, a user equipment (UE) may measure a frequency selectivity of a channel between the UE and a base station and may transmit signaling to the base station indicating one or both of a frequency selectivity metric or a recommended demodulation reference signal (DMRS) port multiplexing pattern based on measuring the frequency selectivity. In some aspects, the UE may transmit the signaling to assist the base station in configuring a DMRS port multiplexing pattern based on current channel conditions. For example, if the frequency selectivity metric satisfies a threshold, the UE may recommend a DMRS port multiplexing pattern absent of code division multiplexing (CDM). Alternatively, if the frequency selectivity metric fails to satisfy the threshold, the UE may recommend a DMRS port multiplexing patter including CDM.

28 Claims, 16 Drawing Sheets

TECHNIQUES FOR PROVIDING UE-ASSISTANCE FOR A SELECTION OF A DEMODULATION REFERENCE SIGNAL PORT MULTIPLEXING PATTERN

CROSS REFERENCE

The present application for patent claims the benefit of U.S. Provisional Patent Application No. 63/137,616 by NAM et al., entitled "TECHNIQUES FOR PROVIDING UE-ASSISTANCE FOR A SELECTION OF A DEMODULATION REFERENCE SIGNAL PORT MULTIPLEXING PATTERN," filed Jan. 14, 2021, assigned to the assignee hereof, and expressly incorporated by reference herein.

TECHNICAL FIELD

The following relates to wireless communications, including techniques for providing user equipment (UE)-assistance for a selection of a demodulation reference signal (DMRS) port multiplexing pattern.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques for providing user equipment (UE)-assistance for a selection of a demodulation reference signal (DMRS) port multiplexing pattern. Generally, the described techniques support a measurement of a frequency selectivity of a channel between a UE and a base station and a signaling exchange between the UE and the base station to indicate, to the base station, the measured frequency selectivity or a DMRS port multiplexing pattern associated with the measured frequency selectivity, or both. In examples in which the UE transmits signaling indicating a DMRS port multiplexing pattern associated with the measured frequency selectivity, the UE may select the DMRS port multiplexing pattern from multiple different DMRS port multiplexing patterns based on how frequency selective the channel is. For example, if the measured frequency selectivity satisfies (such as is greater than) a threshold, the UE may select a DMRS port multiplexing pattern that is absent of code division multiplexing (CDM). Alternatively, if the measured frequency selectivity fails to satisfy (such as is less than) the threshold, the UE may select a DMRS port multiplexing pattern that includes CDM.

Similarly, in examples in which the UE transmits signaling indicating the measured frequency selectivity, the base station may determine whether the indicated frequency selectivity satisfies the threshold and may select a DMRS port multiplexing pattern based on the determination. For example, if the indicated frequency selectivity satisfies (such as is greater than) the threshold, the base station may select a DMRS port multiplexing pattern that is absent of CDM. Alternatively, if the indicated frequency selectivity fails to satisfy (such as is less than) the threshold, the base station may select a DMRS port multiplexing pattern that includes CDM. Regardless of whether the UE selects and indicates the DMRS port multiplexing pattern or whether the base station selects the DMRS port multiplexing pattern, the base station may transmit a configuration to the UE of the selected DMRS port multiplexing pattern. As such, the UE may transmit or receive a DMRS to or from the base station in accordance with the configured DMRS port multiplexing pattern, which may include CDM or be absent of CDM based on the measured frequency selectivity of the channel between the UE and the base station.

A method for wireless communication at a UE is described. The method may include measuring a frequency selectivity of a channel between the UE and a base station, transmitting, to the base station, signaling indicating one or both of a frequency selectivity metric or a DMRS port multiplexing pattern based on the frequency selectivity of the channel, and receiving, from the base station, a configuration of the DMRS port multiplexing pattern based on the signaling.

An apparatus for wireless communication at a UE is described. The apparatus may include at least one processor, memory coupled (e.g., operatively, communicatively, functionally, electronically, or electrically) to the at least one processor, and instructions stored in the memory. The instructions may be executable by the at least one processor to cause the apparatus to measure a frequency selectivity of a channel between the UE and a base station, transmit, to the base station, signaling indicating one or both of a frequency selectivity metric or a DMRS port multiplexing pattern based on the frequency selectivity of the channel, and receive, from the base station, a configuration of the DMRS port multiplexing pattern based on the signaling.

Another apparatus for wireless communication at a UE is described. The apparatus may include means for measuring a frequency selectivity of a channel between the UE and a base station, means for transmitting, to the base station, signaling indicating one or both of a frequency selectivity metric or a DMRS port multiplexing pattern based on the frequency selectivity of the channel, and means for receiving, from the base station, a configuration of the DMRS port multiplexing pattern based on the signaling.

A non-transitory computer-readable medium storing code for wireless communication at a UE is described. The code may include instructions executable by a processor to measure a frequency selectivity of a channel between the UE and a base station, transmit, to the base station, signaling indicating one or both of a frequency selectivity metric or a DMRS port multiplexing pattern based on the frequency selectivity of the channel, and receive, from the base station, a configuration of the DMRS port multiplexing pattern based on the signaling.

In some examples of the method, apparatuses, and non-transitory computer-readable medium described herein, receiving the configuration of the DMRS port multiplexing pattern may include operations, features, means, or instructions for receiving configuration signaling associated with one or more ports of the UE used for a DMRS and indicating whether the one or more ports of the UE are code division multiplexed with a second one or more ports of a second UE.

In some examples of the method, apparatuses, and non-transitory computer-readable medium described herein, transmitting the signaling indicating one or both of the frequency selectivity metric or the DMRS port multiplexing pattern may include operations, features, means, or instructions for transmitting a channel state information (CSI) report including an indication of one or both of the frequency selectivity metric or the DMRS port multiplexing pattern.

In some examples of the method, apparatuses, and non-transitory computer-readable medium described herein, the CSI report includes a bit indicating one of a presence or an absence of CDM in the DMRS port multiplexing pattern.

In some examples of the method, apparatuses, and non-transitory computer-readable medium described herein, transmitting the signaling indicating one or both of the frequency selectivity metric or the DMRS port multiplexing pattern may include operations, features, means, or instructions for transmitting one or more of uplink control information (UCI), a medium access control (MAC) control element (MAC-CE), or a radio resource control (RRC) information element associated with UE assistance information including an indication of one or both of the frequency selectivity metric or the DMRS port multiplexing pattern.

In some examples of the method, apparatuses, and non-transitory computer-readable medium described herein, transmitting the signaling indicating one or both of the frequency selectivity metric or the DMRS port multiplexing pattern may include operations, features, means, or instructions for transmitting a hybrid automatic repeat request (HARQ) feedback message indicating one or both of the frequency selectivity metric or the DMRS port multiplexing pattern.

In some examples of the method, apparatuses, and non-transitory computer-readable medium described herein, transmitting the signaling indicating one or both of the frequency selectivity metric or the DMRS port multiplexing pattern may include operations, features, means, or instructions for transmitting a sounding reference signal (SRS) indicating one or both of the frequency selectivity metric or the DMRS port multiplexing pattern.

In some examples of the method, apparatuses, and non-transitory computer-readable medium described herein, receiving the configuration of the DMRS port multiplexing pattern may include operations, features, means, or instructions for receiving downlink control information (DCI) scheduling one or more ports of the UE for a DMRS and indicating whether the one or more ports of the UE may be code division multiplexed with a second one or more ports of a second UE.

In some examples of the method, apparatuses, and non-transitory computer-readable medium described herein, the frequency selectivity may satisfy a threshold, and transmitting the signaling indicating one or both of the frequency selectivity metric or the DMRS port multiplexing pattern may include operations, features, means, or instructions for transmitting an indication of a first DMRS port multiplexing pattern associated with an absence of CDM based on the frequency selectivity satisfying the threshold.

Some examples of the method, apparatuses, and non-transitory computer-readable medium described herein may further include operations, features, means, or instructions for transmitting or receiving a DMRS across one or more ports of the UE based on the first DMRS port multiplexing pattern associated with the absence of CDM.

In some examples of the method, apparatuses, and non-transitory computer-readable medium described herein, the frequency selectivity may fail to satisfy a threshold, and transmitting the signaling indicating one or both of the frequency selectivity metric or the DMRS port multiplexing pattern may include operations, features, means, or instructions for transmitting an indication of a second DMRS port multiplexing pattern associated with CDM based on the frequency selectivity failing to satisfy the threshold.

Some examples of the method, apparatuses, and non-transitory computer-readable medium described herein may further include operations, features, means, or instructions for transmitting or receiving a DMRS across one or more ports of the UE based on the second DMRS port multiplexing pattern associated with the CDM.

In some examples of the method, apparatuses, and non-transitory computer-readable medium described herein, measuring the frequency selectivity of the channel between the UE and the base station may include operations, features, means, or instructions for receiving, from the base station, one or both of a synchronization signal block (SSB) or a tracking reference signal (TRS) and measuring the frequency selectivity based on one or both of the SSB or the TRS.

In some examples of the method, apparatuses, and non-transitory computer-readable medium described herein, the frequency selectivity metric includes a root mean square (RMS) delay spread and the DMRS port multiplexing pattern includes a subset of a set of indices of a table of DMRS port multiplexing patterns.

A method for wireless communication at a base station is described. The method may include receiving, from a UE, signaling indicating one or both of a frequency selectivity metric or a DMRS port multiplexing pattern based on a frequency selectivity of a channel between the UE and the base station, transmitting, to the UE, a configuration of the DMRS port multiplexing pattern based on the signaling, and transmitting or receiving a DMRS to or from one or more ports of the UE based on the DMRS port multiplexing pattern.

An apparatus for wireless communication at a base station is described. The apparatus may include at least one processor, memory coupled (e.g., operatively, communicatively, functionally, electronically, or electrically) to the at least one processor, and instructions stored in the memory. The instructions may be executable by the at least one processor to cause the apparatus to receive, from a UE, signaling indicating one or both of a frequency selectivity metric or a DMRS port multiplexing pattern based on a frequency selectivity of a channel between the UE and the base station, transmit, to the UE, a configuration of the DMRS port multiplexing pattern based on the signaling, and transmit or receive a DMRS to or from one or more ports of the UE based on the DMRS port multiplexing pattern.

Another apparatus for wireless communication at a base station is described. The apparatus may include means for receiving, from a UE, signaling indicating one or both of a frequency selectivity metric or a DMRS port multiplexing pattern based on a frequency selectivity of a channel between the UE and the base station, means for transmitting, to the UE, a configuration of the DMRS port multiplexing pattern based on the signaling, and means for transmitting or receiving a DMRS to or from one or more ports of the UE based on the DMRS port multiplexing pattern.

A non-transitory computer-readable medium storing code for wireless communication at a base station is described. The code may include instructions executable by a processor to receive, from a UE, signaling indicating one or both of a frequency selectivity metric or a DMRS port multiplexing pattern based on a frequency selectivity of a channel between the UE and the base station, transmit, to the UE, a configuration of the DMRS port multiplexing pattern based on the signaling, and transmit or receive a DMRS to or from one or more ports of the UE based on the DMRS port multiplexing pattern.

In some examples of the method, apparatuses, and non-transitory computer-readable medium described herein, transmitting the configuration of the DMRS port multiplexing pattern may include operations, features, means, or instructions for transmitting configuration signaling associated with the one or more ports of the UE used for the DMRS and indicating whether the one or more ports of the UE are code division multiplexed with a second one or more ports of a second UE.

In some examples of the method, apparatuses, and non-transitory computer-readable medium described herein, receiving the signaling indicating one or both of the frequency selectivity metric or the DMRS port multiplexing pattern may include operations, features, means, or instructions for receiving a CSI report including an indication of one or both of the frequency selectivity metric or the DMRS port multiplexing pattern.

In some examples of the method, apparatuses, and non-transitory computer-readable medium described herein, the CSI report includes a bit indicating one of a presence or an absence of CDM in the DMRS port multiplexing pattern.

In some examples of the method, apparatuses, and non-transitory computer-readable medium described herein, receiving the signaling indicating one or both of the frequency selectivity metric or the DMRS port multiplexing pattern may include operations, features, means, or instructions for receiving one or more of UCI, a MAC-CE, or an RRC information element associated with UE assistance information including an indication of one or both of the frequency selectivity metric or the DMRS port multiplexing pattern.

In some examples of the method, apparatuses, and non-transitory computer-readable medium described herein, receiving the signaling indicating one or both of the frequency selectivity metric or the DMRS port multiplexing pattern may include operations, features, means, or instructions for receiving a HARQ feedback message and selecting the DMRS port multiplexing pattern based on the HARQ feedback message.

In some examples of the method, apparatuses, and non-transitory computer-readable medium described herein, receiving the signaling indicating one or both of the frequency selectivity metric or the DMRS port multiplexing pattern may include operations, features, means, or instructions for receiving an SRS, measuring the frequency selectivity based on the SRS, and selecting the DMRS port multiplexing pattern based on the frequency selectivity.

In some examples of the method, apparatuses, and non-transitory computer-readable medium described herein, transmitting the configuration of the DMRS port multiplexing pattern may include operations, features, means, or instructions for transmitting DCI scheduling one or more ports of the UE for the DMRS and indicating whether the one or more ports of the UE may be code division multiplexed with a second one or more ports of a second UE.

In some examples of the method, apparatuses, and non-transitory computer-readable medium described herein, the frequency selectivity may satisfy a threshold, and receiving the signaling indicating one or both of the frequency selectivity metric or the DMRS port multiplexing pattern may include operations, features, means, or instructions for receiving an indication of a first DMRS port multiplexing pattern associated with an absence of CDM based on the frequency selectivity satisfying the threshold.

In some examples of the method, apparatuses, and non-transitory computer-readable medium described herein, transmitting or receiving the DMRS to the one or more ports of the UE based on the DMRS port multiplexing pattern may include operations, features, means, or instructions for transmitting or receiving the DMRS to the one or more ports of the UE based on the first DMRS port multiplexing pattern associated with the absence of CDM.

In some examples of the method, apparatuses, and non-transitory computer-readable medium described herein, the frequency selectivity may fail to satisfy a threshold, receiving the signaling indicating one or both of the frequency selectivity metric or the DMRS port multiplexing pattern may include operations, features, means, or instructions for receiving an indication of a second DMRS port multiplexing pattern associated with CDM based on the frequency selectivity failing to satisfy the threshold.

In some examples of the method, apparatuses, and non-transitory computer-readable medium described herein, transmitting or receiving the DMRS to the one or more ports of the UE based on the DMRS port multiplexing pattern may include operations, features, means, or instructions for transmitting or receiving the DMRS to the one or more ports of the UE based on the second DMRS port multiplexing pattern associated with the CDM.

Some examples of the method, apparatuses, and non-transitory computer-readable medium described herein may further include operations, features, means, or instructions for transmitting, to the UE, one or both of an SSB or a TRS, where receiving the signaling indicating one or both of the frequency selectivity metric or the DMRS port multiplexing pattern may be based on transmitting one or both of the SSB or the TRS.

In some examples of the method, apparatuses, and non-transitory computer-readable medium described herein, the frequency selectivity metric includes an RMS delay spread and the DMRS port multiplexing pattern includes a subset of a set of indices of a table of DMRS port multiplexing patterns.

DETAILED DESCRIPTION

Figure 1:
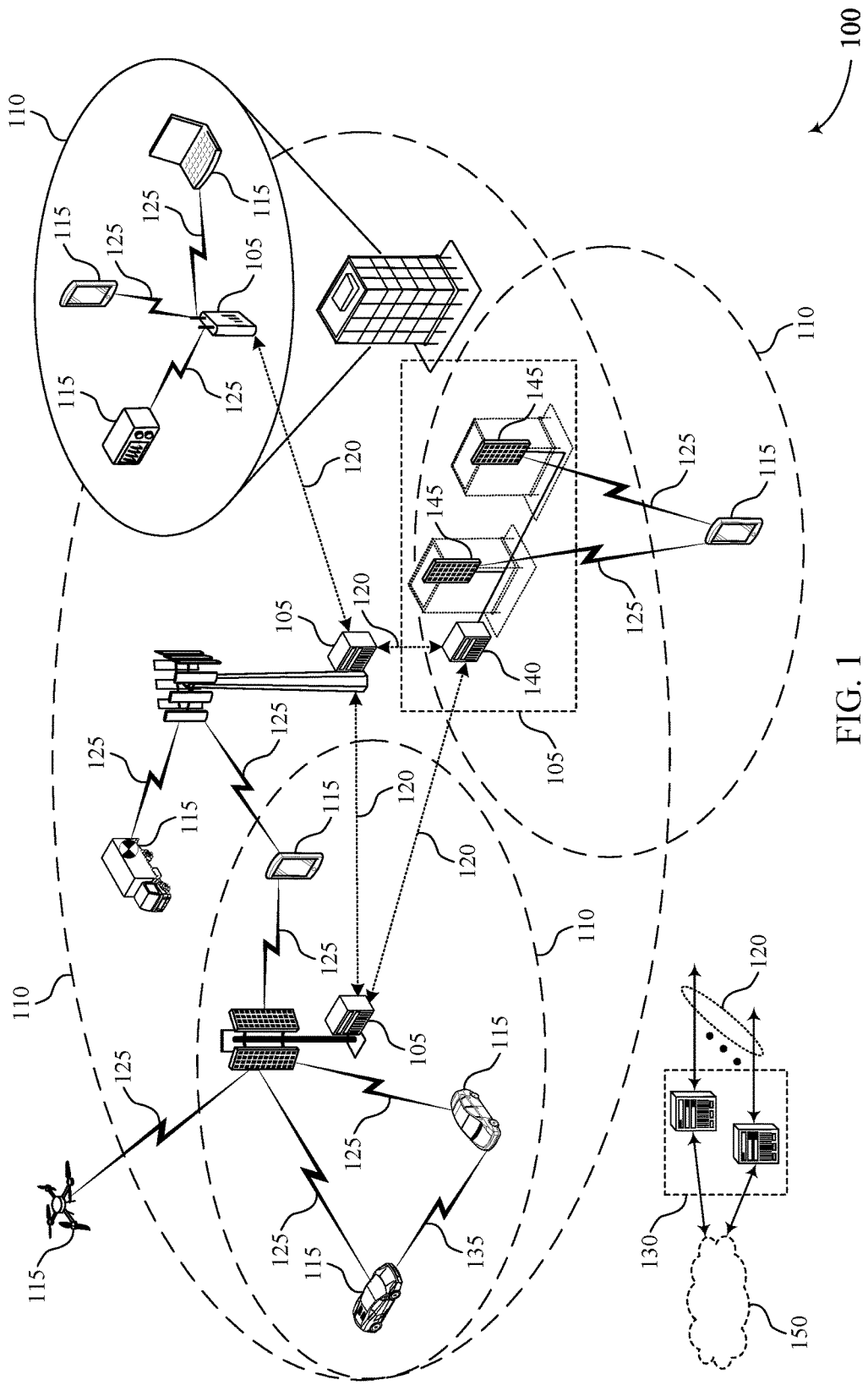
FIGS. 1 and 2 illustrate examples of wireless communications systems that support techniques for providing user equipment (UE)-assistance for a selection of a demodulation reference signal (DMRS) port multiplexing pattern in accordance with aspects of the present disclosure.

In some wireless communications systems, a user equipment (UE) may transmit or receive a demodulation reference signal (DMRS) to or from a base station over a channel. In some aspects, the receiving device (e.g., the UE or the base station) may use the DMRS to estimate a quality of the channel between the UE and the base station. The transmitting device (e.g., the UE or the base station) may orthogonally multiplex multiple DMRS ports (of the UE or of different UEs) in the frequency domain and the code domain. For example, the transmitting device may employ a DMRS port multiplexing pattern that includes a combination of frequency division multiplexing (FDM) and code division multiplexing (CDM). In some cases, such as in cases in which the UE and the base station communicate over relatively high frequencies (such as over frequencies in the 60 GHz band), a subcarrier spacing (SCS) employed for communication between the UE and the base station may in turn increase (to 960 kHz, for example). Such a relatively higher SCS may be associated with a relatively higher frequency selectivity of channel fading for communication over the channel, which may adversely affect an ability of the UE or the base station to accurately estimate the quality of the channel using the DMRS. For instance, the relatively higher frequency selectivity of the channel fading may cause a loss in orthogonality for DMRS ports that are multiplexed according to a CDM scheme.

To support accurate channel estimation despite the relatively higher frequency selectivity of the channel fading at such higher frequencies, the UE and the base station may employ various DMRS port multiplexing patterns for DMRS transmissions. In some cases, some of the various DMRS port multiplexing patterns may be more or less effective than others depending on a frequency selectivity of the channel (such as a current frequent frequency selectivity of the channel). The base station (which may configure the DMRS port multiplexing pattern), however, may be unable to fully or accurately assess a current frequency selectivity of the channel, which may result in a sub-optimal selection of one of the various DMRS port multiplexing patterns. Such a sub-optimal selection may be associated with implementation of a DMRS port multiplexing pattern that provides a relatively lower reliability or likelihood for successful communication, as a device receiving a DMRS in accordance with the sub-optimally selected DMRS port multiplexing pattern may obtain a relatively more inaccurate channel quality measurement using the received DMRS.

In some implementations of the present disclosure, the UE may measure the current frequency selectivity of the channel and may transmit signaling to the base station indicating one or both of the measured frequency selectivity or a DMRS port multiplexing pattern based on the measured frequency selectivity. In some examples, for instance, the UE may transmit a frequency selectivity report to the base station including one or both of the measured frequency selectivity or the DMRS port multiplexing pattern (which may be a UE-recommended or suggested DMRS port multiplexing pattern based on the measured frequency selectivity). Alternatively, in some other examples, the UE may transmit a feedback message, such as a hybrid automatic repeat request (HARQ) feedback message, or a sounding reference signal (SRS) to the base station and the base station may use the feedback message or the SRS to identify or measure the current frequency selectivity.

As such, the base station may obtain knowledge of the current frequency selectivity of the channel or of the recommended or suggested DMRS port multiplexing pattern from the UE that is based on the current frequency selectivity, or may obtain both, and may select a DMRS port multiplexing pattern based on the obtained knowledge. In some examples, the UE or the base station may select a first DMRS port multiplexing pattern that is absent of CDM if the current frequency selectivity satisfies (such as is greater than) a threshold and may select a second DMRS port multiplexing pattern that includes CDM if the current frequency selectivity fails to satisfy (such as is less than) the threshold.

Particular aspects of the subject matter described in this disclosure can be implemented to realize one or more of the following potential advantages. For example, the described techniques may be implemented to support a dynamic selecting of a DMRS port multiplexing pattern for uplink or downlink DMRS transmissions based on the current frequency selectivity of the channel between the UE and the base station, which may enable the UE and the base station to employ a DMRS port multiplexing pattern that is suited for the current channel conditions. For instance, if the UE or the base station measures or otherwise identifies that the channel has a relatively higher frequency selectivity, the UE and the base station may employ a DMRS port multiplexing pattern that is absent CDM for two DMRS ports, which may result in more reliable or more accurate channel estimation. Alternatively, if the UE or the base station measures or otherwise identifies that the channel has a relatively lower frequency selectivity, the UE and the base station may employ a DMRS port multiplexing pattern that includes CDM of two DMRS ports in a same CDM group, which may result in higher throughput between the UE and the base station by enabling FDM of DMRS and data on a same symbol and CDM between DMRS ports of multiple UEs (e.g., as may be relevant for some multi-user (MU) deployments). As such, the UE and the base station may balance higher data rates and increased throughput with higher reliability and accuracy of channel estimation based on the current channel conditions, which may improve overall system performance and coordination.

Aspects of the disclosure are initially described in the context of wireless communications systems. Additionally, aspects of the disclosure are illustrated by and described with reference to DMRS port multiplexing patterns and a process flow. Aspects of the disclosure are further illustrated by and described with reference to apparatus diagrams, system diagrams, and flowcharts that relate to techniques for providing UE-assistance for a selection of a DMRS port multiplexing pattern.

FIG. 1 illustrates an example of a wireless communications system 100 that supports techniques for providing UE-assistance for a selection of a DMRS port multiplexing pattern in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology. Components within a wireless communication system may be coupled (for example, operatively, communicatively, functionally, electronically, or electrically) to each other.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, FDM techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords).

Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information (CSI) reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may transmit or receive a DMRS to or from a base station 105 over a channel between the UE 115 and the base station 105. In some aspects, a receiving device (e.g., the UE 115 or the base station 105) may use the DMRS to estimate a quality of the channel or other channel conditions that may affect wireless communication between the UE 115 and the base station 105. In other words, for example, the UE 115 and the base station 105 may transmit or receive the DMRS as part of a channel estimation procedure.

In some cases, the base station 105 may configure a DMRS port multiplexing pattern according to which the UE 115 or the base station 105 may transmit the DMRS. The DMRS port multiplexing pattern may correspond to how DMRS ports of the UE 115 are multiplexed with other DMRS ports of the UE 115 or with DMRS ports of other UEs 115. In some cases, for example, a first DMRS port multiplexing pattern may include an FDM of two or more DMRS ports in the frequency domain and a CDM of two or more ports in the code domain and a second DMRS port multiplexing pattern may include an FDM of two or more DMRS ports in the frequency domain without CDM in the code domain. Further, a third DMRS port multiplexing pattern may include a CDM of two or more ports in the code domain without FDM in the frequency domain.

Figure 2:
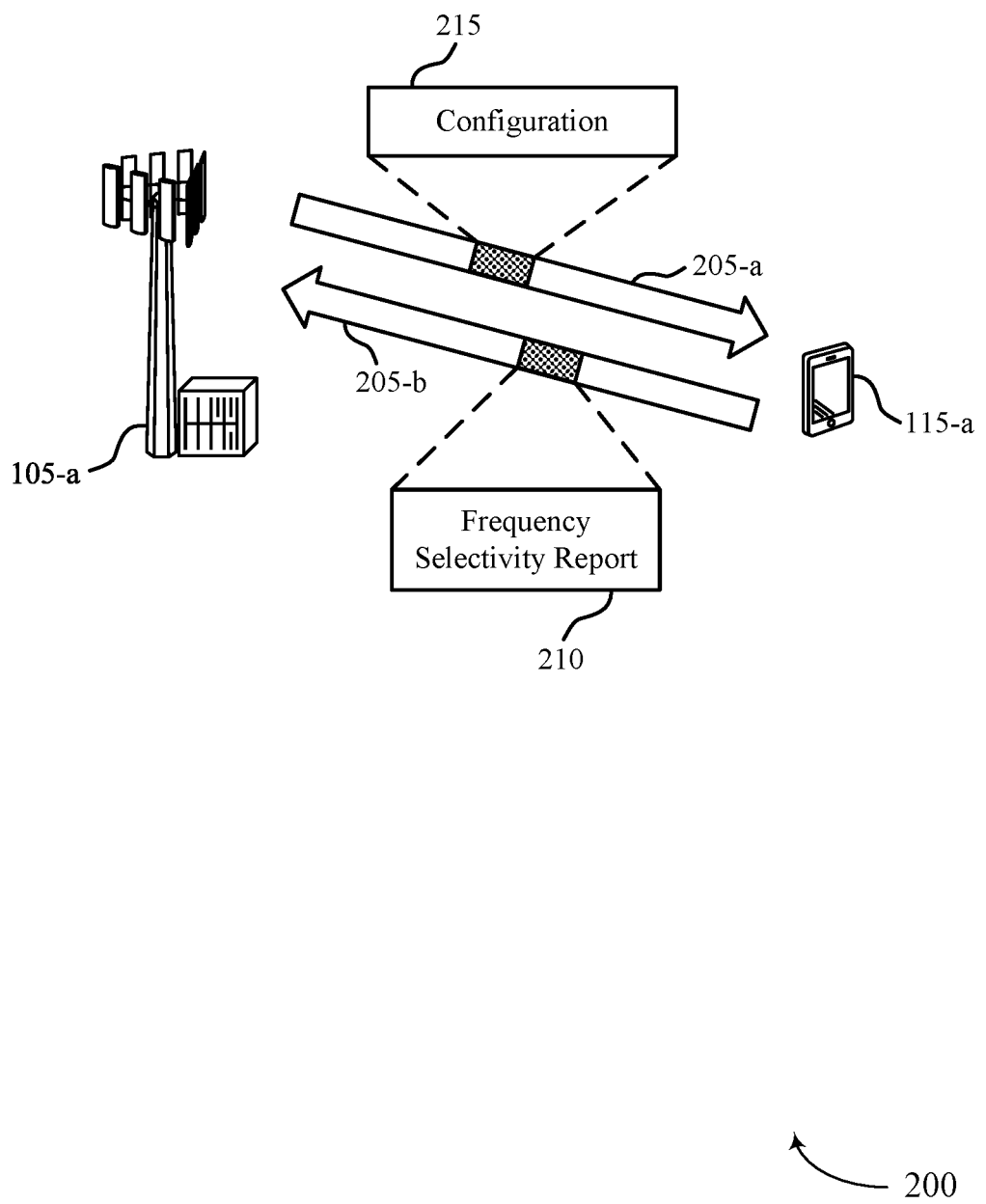

As described in more detail herein, including with reference to FIG. 2, each of such various DMRS port multiplexing patterns may be relatively more or less suited for specific channel conditions than others of the various DMRS port multiplexing patterns. In some cases, however, the base station 105 (which may configure the DMRS port multiplexing pattern) may be unaware of some channel conditions that may cause one DMRS port multiplexing pattern to provide relatively greater throughput or channel estimation accuracy than other DMRS port multiplexing patterns, which may result in a sub-optimal selection and configuration of a DMRS port multiplexing pattern. For example, the base station 105 may be unable to fully or accurately assess a frequency selectivity of the channel between the UE 115 and the base station 105, which may influence which of the various DMRS port multiplexing patterns results in a relatively greater throughput or channel estimation accuracy.

In some implementations of the present disclosure, the UE 115 may measure the frequency selectivity of the channel between the UE 115 and the base station 105 and may transmit signaling to the base station 105 indicating one or both of the measured frequency selectivity (e.g., in the form of a frequency selectivity metric) or a DMRS port multiplexing pattern based on measuring the frequency selectivity of the channel. As such, the base station 105 may obtain, from the UE 115, one or both of the frequency selectivity (as measured by the UE 115) or a recommended or suggested DMRS port multiplexing pattern based on the measured frequency selectivity. The base station 105 may use the indicated frequency selectivity or the recommended or suggested DMRS port multiplexing pattern to select a DMRS port multiplexing pattern for a DMRS transmission between the UE 115 and the base station 105 and may transmit, to the UE 115, a configuration of the selected DMRS port multiplexing pattern.

FIG. 2 illustrates an example of a wireless communications system 200 that supports techniques for providing UE-assistance for a selection of a DMRS port multiplexing pattern in accordance with aspects of the present disclosure. The wireless communications system 200 may implement or be implemented to realize aspects of the wireless communications system 100. For example, the wireless communications system 200 may include a UE 115-a and a base station 105-a, which may be examples of corresponding devices described herein, including with reference to FIG. 1. In some examples, the UE 115-a may transmit signaling, such as a frequency selectivity report 210, indicating one or both of a frequency selectivity metric or a DMRS port multiplexing pattern based on a measured frequency selectivity of a channel between the UE 115-a and the base station 105-a.

For example, the UE 115-a and the base station 105-a may establish a communication link 205, including a downlink communication link 205-a and an uplink communication link 205-b, and may communicate with each other over the channel (e.g., a radio frequency channel) upon establishing the communication link 205. In some aspects, the UE 115-a or the base station 105-a may transmit a DMRS to the other of the UE 115-a or the base station 105-a as part of a channel estimation procedure. As such, the receiving device (which may be the UE 115-a or the base station 105-a, depending on which of the UE 115-a or the base station 105-a transmits the DMRS) may use the DMRS to measure or otherwise identify a channel quality or any other metrics (e.g., a signal quality, a path loss, a propagation delay, a receive power, a delay spread, or a Doppler shift) associated with the channel between the UE 115-a and the base station 105-a.

In some cases, the transmitting device (the UE 115-a or the base station 105-a) may transmit the DMRS in accordance with a DMRS configuration associated with a DMRS port multiplexing pattern. The UE 115-a and the base station 105-a may support various DMRS configurations and various DMRS port multiplexing patterns. For example, the UE 115-a and the base station 105-a may support a configuration type 1 or a configuration type 2 (for both downlink and uplink DMRS). In some aspects, both of the configuration type 1 and the configuration type 2 may include orthogonally multiplexed DMRS ports in the frequency domain and the code domain (e.g., FDM+CDM) on a same symbol. For example, on the same symbol, different DMRS ports may occupy different resource elements in the frequency domain as well as different layers in the code domain. The configuration type 1 is further illustrated by and described with reference to FIG. 3 and the configuration type 2 is further illustrated by and described with reference to FIG. 4. In some aspects, the UE 115-a may select one of the configuration type 1 or the configuration type 2.

To perform channel estimation based on a DMRS transmitted according to the configuration type 1 or the configuration type 2, the receiving device (the UE 115-a or the base station 105-a) may de-multiplex the DMRS ports and interpolate the channel conditions for resource elements without DMRS (as, for a DMRS port, DMRS may not occupy every resource element, e.g., DMRS may occupy every other resource element in a configuration type 1). For the de-multiplexing of the DMRS ports, the receiving device may de-multiplex the CDM (which may be equivalently referred to as de-CDM) prior to de-multiplexing the FDM (which may be equivalently referred to as de-FDM) or as a first step in the channel estimation. For instance, in examples in which the UE 115-a receives a multi-layer data transmission from the base station 105-a including a DMRS, DMRS ports of the UE 115-a (a same UE 115) may be code division multiplexed and the UE 115-a may de-CDM such DMRS ports of the UE 115-*a*. Alternatively, in examples in which the UE 115-*a* receives a single-layer transmission, the UE 115-*a* may assume that the DMRS ports of the UE 115-*a* are code division multiplexed with DMRS ports of other UEs 115. In such examples, for instance, the UE 115-*a* may assume that the UE 115-*a* and the base station 105-*a* are involved in an MU-MIMO deployment in which the base station 105-*a* code division multiplexes transmissions to multiple UEs 115 over a same set of resources (e.g., over a same one or more symbols or resource elements).

In some examples, such as in examples in which the UE 115-*a* and the base station 105-*a* communicate over a relatively higher frequency, the UE 115-*a* and the base station 105-*a* may employ a relatively larger SCS (as compared to SCSs employed at relatively lower frequencies). For instance, in examples in which the UE 115-*a* and the base station 105-*a* communicate over a radio frequency in the 60 GHz band, the UE 115-*a* and the base station 105-*a* may communicate using an SCS of 960 kHz. Such a relatively higher SCS (as compared to 15 kHz, 30 kHz, 60 kHz, or 120 kHz that may be employed at relatively lower frequencies, such as FR1 or FR2 radio frequency bands) may be more robust against phase noise, which may have a relatively larger impact on communications over relatively higher frequencies (such as 60 GHz) than on communications over relatively lower frequencies (such as 30 GHz).

Further, the UE 115-*a* and the base station 105-*a* may experience a relatively larger delay spread (which may be common at such relatively higher frequencies). Such a larger delay spread may be associated with a greater block error rate (BLER), which may result in a lower likelihood for successful communication between the UE 115-*a* and the base station 105-*a*. For example, an increase in delay spread from 20 nanoseconds to 40 nanoseconds may increase BLER by orders of magnitude. Sometimes, such an increase in delay spread may adversely affect code division multiplexed transmissions more than non-code division multiplexed transmissions and may affect frequency division multiplexed transmissions more than non-frequency division multiplexed transmissions.

Accordingly, such a relatively larger SCS and delay spread may degrade the accuracy of the channel estimation performed by the receiving device (e.g., the UE 115-*a* or the base station 105-*a*). Further, such relatively larger SCSs and delay spreads may be associated with large-bandwidth transmissions, which may be relatively more susceptible to adverse effects relating to frequency selectivity of channel fading across resource elements. For example, if the channel between the UE 115-*a* and the base station 105-*a* has a relatively high frequency selectivity of channel fading across resource elements (as may be common for large-bandwidth transmissions), the orthogonality for code division multiplexed DMRS ports may be lost. Such a broken orthogonality in the code domain may result in interference across DMRS ports, which may degrade channel estimation accuracy and reliability. Additionally, interpolation across resource elements may become more difficult or more inaccurate due to a relatively low correlation of channel coefficients across resource elements.

As such, the UE 115-*a* and the base station 105-*a* may employ a DMRS port multiplexing pattern that maintains or improves channel estimation accuracy despite the relatively higher frequency selectivity. In some examples, for instance, the UE 115-*a* and the base station 105-*a* may employ a DMRS port multiplexing pattern that uses all resource elements in a symbol for a DMRS. For example, instead of using an FDM-based comb pattern to separate DMRS ports across resource elements, the UE 115-*a* and the base station 105-*a* may employ a DMRS port multiplexing pattern that is absent of FDM and includes a DMRS for a DMRS port in all resource elements in a symbol. Such a DMRS port multiplexing pattern is further illustrated by and described with reference to FIG. 5.

Figure 3:
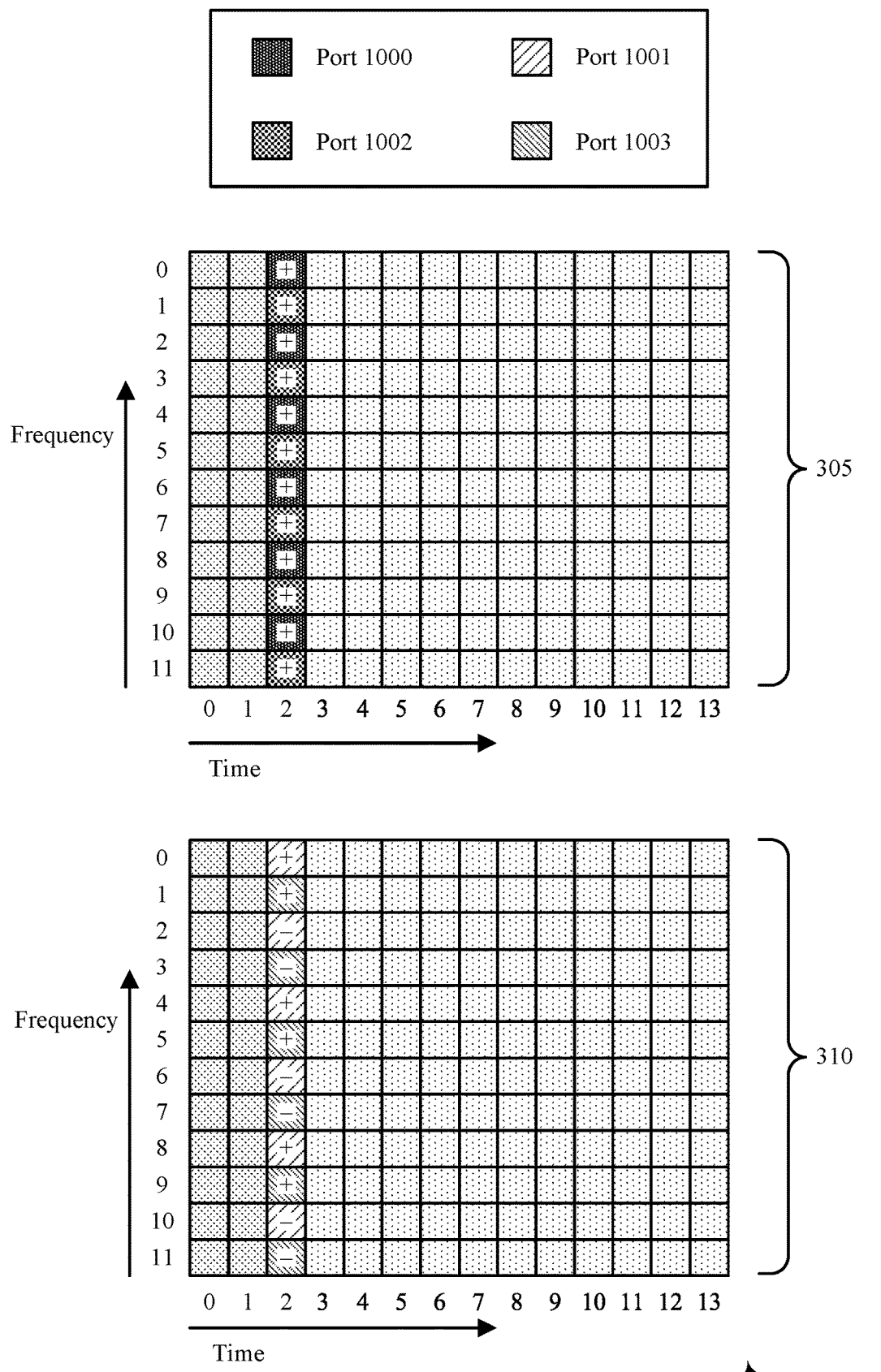
FIGS. 3 through 5 illustrate examples of DMRS port multiplexing patterns that support techniques for providing UE-assistance for a selection of a DMRS multiplexing pattern in accordance with aspects of the present disclosure.
Figure 4:
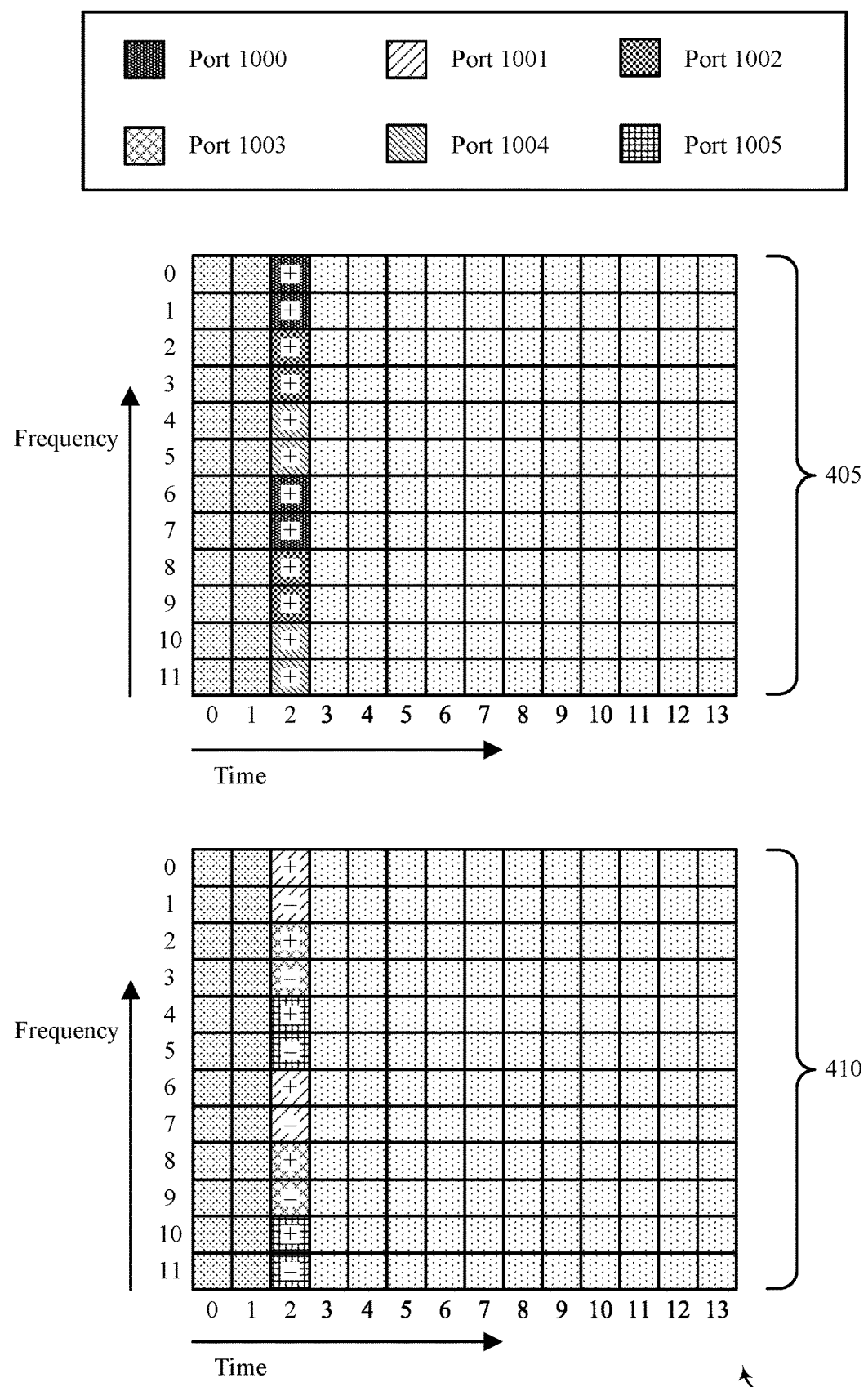

Alternatively, the UE 115-*a* and the base station 105-*a* may maintain an FDM-based comb pattern for DMRS, but may restrict an upper limit or maximum modulation and coding scheme (MCS) or prohibit CDM. For example, the UE 115-*a* and the base station 105-*a* may employ a DMRS port multiplexing pattern as illustrated by FIG. 3 or 4 and, because performance degradation associated with the channel estimation increases or becomes more pronounced at relatively higher MCSs or if multiple DMRS ports are code division multiplexed, the UE 115-*a* and the base station 105-*a* may either restrict the maximum MCS or prohibit CDM of DMRS ports. In examples in which the UE 115-*a* or the base station 105-*a* prohibit CDM of DMRS ports, a maximum or upper limit number of DMRS ports (or, equivalently, a maximum or upper limit number of MIMO layers) that the UE 115-*a* or the base station 105-*a* may multiplex may be reduced by half.

Prohibiting or otherwise disallowing CDM of DMRS ports may be associated with some benefits and such benefits may be associated with a desired throughput or reliability. For example, if no CDM for two DMRS ports is used, the UE 115-*a* or the base station 105-*a* may experience relatively higher reliability for channel estimation in highly frequency selective channels. However, in such examples of no CDM for the two DMRS ports, the wireless communications system 200 may experience throughput degradation due to a lack of FDM between data and DMRS and a relatively limited (or smaller) maximum number of layers that may be multiplexed. On the other hand, if the two DMRS ports are in a same CDM group and are code division multiplexed, the UE 115-*a* or the base station 105-*a* may experience performance degradation or relatively lower reliability for channel estimation in highly frequency selective channels. However, in such examples of CDM for the two DMRS ports, the wireless communications system 200 may experience higher throughout (e.g., higher throughput from the UE 115-*a* to the base station 105-*a*) based on FDM DMRS and data on a same symbol. Further, based on employing CDM for the two DMRS ports, the base station 105-*a* may experience greater throughput (e.g., higher cell throughput) in some MU-MIMO deployments.

As such, the UE 115-*a* and the base station 105-*a* may experience relatively better or worse performance using either CDM or no-CDM depending on the channel frequency selectivity (and the scheduled MCS). In some cases, however, the base station 105-*a*, which may configure the DMRS port multiplexing pattern, may be unable to fully or accurately assess a current channel frequency selectivity of the channel between the UE 115-*a* and the base station 105-*a*, which may result in sub-optimal selection or configuration of DMRS port multiplexing patterns based on the actual current channel conditions.

In some implementations of the present disclosure, the UE 115-*a* may measure the current frequency selectivity of the channel between the UE 115-*a* and the base station 105-*a* and may transmit a frequency selectivity report 210 to the base station 105-*a* indicating one or both of the current frequency selectivity of the channel or a recommend or suggested DMRS port multiplexing pattern (e.g., a DMRS port multiplexing pattern including CDM or absent of CDM) corresponding to the current frequency selectivity of the channel. Such a frequency selectivity report 210 from the UE 115-a may assist the base station 105-a in the selection of a DMRS port multiplexing pattern based on current channel conditions. In some aspects, the frequency selectivity that the UE 115-a may measure and report via the frequency selectivity report 210 may include a frequency domain auto-correlation or a root mean square (RMS) delay spread of the channel.

In some examples, the UE 115-a may measure the current frequency selectivity of the channel between the UE 115-a and the base station 105-a based on measuring one or more downlink reference signals from the base station 105-a. For example, the base station 105-a may transmit one or more downlink reference signals, such as a synchronization signal block (SSB) or a tracking reference signal (TRS), and the UE 115-a may measure the one or more downlink reference signals to obtain knowledge of the current frequency selectivity of the channel. Further, although described herein in the context of a frequency selectivity, the UE 115-a may measure and report any other channel condition metric associated with (or that may otherwise influence) a quality or a receive strength of the channel between the UE 115-a and the base station 105-a.

In examples in which the UE 115-a indicates a DMRS port multiplexing pattern via the frequency selectivity report 210, the UE 115-a may select to indicate a DMRS port multiplexing pattern including CDM or absent of CDM based on the relative frequency selectivity of the channel. For instance, in examples in which the UE 115-a measures a current frequency selectivity that satisfies (such as is greater than) a threshold frequency selectivity, the UE 115-a may select and transmit an indication of a first DMRS port multiplexing pattern associated with an absence of CDM. In other words, based on measuring that the channel between the UE 115-a and the base station 105-a has a relatively high frequency selectivity, the UE 115-a may recommend a no-CDM DMRS port multiplexing pattern (which may be provide a more reliable and accurate channel estimation procedure in highly frequency selective channels). Alternatively, in examples in which the UE 115-a measures a current frequency selectivity that fails to satisfy (such as is less than) the threshold frequency selectivity, the UE 115-a may select and transmit an indication of a second DMRS port multiplexing pattern associated with CDM. In other words, based on measuring that the channel between the UE 115-a and the base station 105-a has a relatively low frequency selectivity, the UE 115-a may recommend a DMRS port multiplexing pattern including CDM (which may provide greater throughput and maintain suitable channel estimation accuracy in relatively low frequency selective channels).

In some aspects, the UE 115-a may indicate a DMRS port multiplexing pattern (such as the first DMRS port multiplexing pattern associated with the absence of CDM or the second DMRS port multiplexing pattern associated with CDM, or any other DMRS port multiplexing pattern) based on indicating a subset of indices from a DMRS port multiplexing pattern table, as shown in Table 1. In some examples, such a DMRS port multiplexing pattern table may be referred to as an antenna port table and may be defined in a specification.

TABLE 1

| DMRS Antenna Port Multiplexing Patterns | | | | | | | |
|---|---|---|---|---|---|---|---|
| One Codeword: Codeword 0 enabled, Codeword 1 disabled | | | | Two Codewords: Codeword 0 enabled, Codeword 1 enabled | | | |
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |

TABLE 1-continued

DMRS Antenna Port Multiplexing Patterns

| | One Codeword: Codeword 0 enabled, Codeword 1 disabled | | | Two Codewords: Codeword 0 enabled, Codeword 1 enabled | | |
|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

As shown in Table 1, a UE 115-*a* may indicate, via the frequency selectivity report 210, one or more values (e.g., from the "value" column of Table 1). Each indicated value may correspond to a number of DMRS CDM group(s) without data, a number of DMRS port(s), and a number of front-load symbols in examples in which one codeword (e.g., codeword 0) is enabled and another (e.g., codeword 1) is disabled. In examples in which two codewords (e.g., codeword 0 and codeword 1) are enabled, each indicated value may similarly correspond to a number of DMRS CDM group(s) without data, a number of DMRS port(s), and a number of front-load symbols. In an example, the UE 115-*a* may indicate, via the frequency selectivity report 210, a value 0, a value 1, a value 3, a value 4, a value 5, a value 6, or a value 11 (for one codeword) to indicate a recommended or suggested DMRS port multiplexing pattern associated with an absence of CDM.

The UE 115-*a* may transmit the frequency selectivity report 210 according to various signaling mechanisms. In some examples, for instance, the UE 115-*a* may transmit the frequency selectivity report 210 within a CSI report. For example, a CSI report may be extended with one or more fields or one or more bits to allow for channel frequency selectivity reporting or for (recommended) DMRS port multiplexing pattern reporting. In examples in which a reported rank indicator (RI) is 1 or 2 for a DMRS configuration type 1 (as illustrated by FIG. 3), for instance, the UE 115-*a* may be configured to report an additional bit (e.g., one bit) indicating one of the first DMRS port multiplexing pattern or the second DMRS port multiplexing pattern (e.g., indicating either CDM or no-CDM). As such, at least in cases in which the UE 115-*a* reports sub-band based CSI, the CSI report may include a PMI per sub-band and indicate how frequency selective the channel is (as PMI per sub-band and the frequency selectivity of the channel may be indicated separately within the CSI report). Further, although frequency selectivity reporting and sub-band PMI reporting may be jointly enabled for the CSI report, frequency selectivity reporting may also be enabled separately from sub-band PMI reporting (such that the UE 115-*a* may report the frequency selectivity even in cases in which the UE 115-*a* does not report sub-band based CSI).

Additionally or alternatively, the UE 115-*a* may transmit the frequency selectivity report 210 via uplink control information (UCI) (such as via a dedicated UCI format), a MAC control element (MAC-CE), or UE assistance information (via RRC signaling), or any combination thereof. Further, although FIG. 2 illustrates a frequency selectivity report 210, the signaling that the UE 115-*a* transmits to indicate one or both of the measured frequency selectivity or the recommended DMRS port multiplexing pattern may include signaling different from a report. For example, the UE 115-*a* may transmit a HARQ feedback message to the base station 105-*a* and the base station 105-*a* may identify or otherwise determine one or both of the frequency selectivity or a DMRS port multiplexing pattern based on the HARQ feedback message. Additionally or alternatively, the UE 115-*a* may transmit signaling over an uplink channel, such as an SRS, and the base station 105-*a* may select or otherwise determine a DMRS port multiplexing pattern based on the uplink channel sounding (e.g., based on the SRS-based channel sounding).

The base station 105-*a*, in response to the frequency selectivity report 210 from the UE 115-*a*, may select a DMRS port multiplexing pattern based on the frequency selectivity or the DMRS port multiplexing pattern indicated by the UE 115-*a*. For example, if the base station 105-*a* receives the frequency selectivity report 210 including an indication of a relatively high frequency selectivity (e.g., greater than the threshold frequency selectivity) or an indication of a DMRS port multiplexing pattern absent of CDM, the base station 105-*a* may select or otherwise configure an uplink or downlink DMRS transmission with a DMRS port multiplexing pattern that is absent of CDM. For instance, the base station 105-*a* may select or configure the uplink or downlink DMRS transmission with a DMRS port multiplexing pattern corresponding to a value of 0, 1, 3-6, or 11 in Table 1. In other words, values of 0, 1, 3-6, and 11 in Table 1 (for one codeword) may correspond to DMRS port multiplexing patterns that are absent of CDM. In some aspects, the base station 105-*a* may transmit a configuration 215 to the UE 115-*a* to configure the selected DMRS port multiplexing pattern at the UE 115-*a*. For example, the base station 105-*a* may include one or more values from Table 1 in the configuration 215.

In such examples in which a DMRS port multiplexing pattern absent of CDM is selected for use with the UE 115-*a* based on the frequency selectivity report 210, and if the base station 105-*a* is operating in an MU-MIMO deployment, the base station 105-*a* may refrain from multiplexing DMRS ports of the UE 115-*a* with DMRS ports of other UEs 115 in the same CDM group as the UE 115-*a* based on the selected no-CDM DMRS port multiplexing pattern. As such, the UE 115-*a* may refrain or otherwise skip a de-CDM step in channel estimation.

In some implementations, the base station 105-a may guarantee an absence of CDM of DMRS ports of the UE 115-a (or with DMRS ports of other UEs 115) if no-CDM is indicated by the UE 115-a via the frequency selectivity report 210. In such implementations, the base station 105-a may transmit the configuration 215 indicating either a DMRS port multiplexing pattern either including CDM or being absent of CDM based on the measurement or recommendation of the UE 115-a as provided in the frequency selectivity report 210. In some other implementations, the base station 105-a may include additional information in a scheduling downlink control information (DCI) to indicate whether a scheduled DMRS port (or DMRS ports) is (are) multiplexed with DMRS ports of other UEs 115 in the same CDM group as the UE 115-a. In other words, the configuration 215 may include or refer to a DCI scheduling one or more DMRS ports of the UE 115-a for a DMRS for a physical uplink shared channel (PUSCH) transmission or a physical downlink shared channel (PDSCH) transmission and indicating whether the one or more DMRS ports of the UE 115-a are code division multiplexed with a second one or more DMRS ports of a second UE 115. To indicate whether the one or more DMRS ports of the UE 115-a are code division multiplexed, the base station 105-a may include a bit (e.g., a one-bit field) in the DCI (e.g., the configuration 215) indicating whether the one or more DMRS ports of the UE 115-a are code division multiplexed. In some aspects, the base station 105-a may provide such additional information in the scheduling DCI in MU-MIMO deployments.

As such, the UE 115-a may receive the configuration 215 of a DMRS port multiplexing pattern based on the frequency selectivity report (or based on HARQ feedback or an SRS transmission) and may transmit or receive a DMRS based on the DMRS port multiplexing pattern indicated in the configuration 215. Accordingly, the UE 115-a and the base station 105-a may configure a DMRS port multiplexing pattern that is based on the current channel conditions (e.g., the current channel frequency selectivity), which may result in greater system throughput in examples in which the channel has a relatively low frequency selectivity or greater reliability and accuracy of channel estimation in examples in which the channel has a relatively high frequency selectivity.

FIG. 3 illustrates an example of a DMRS port multiplexing pattern 300 that supports techniques for providing UE-assistance for a selection of a DMRS port multiplexing pattern in accordance with aspects of the present disclosure. In some examples, a base station 105 may configure a DMRS port multiplexing pattern 300 (with or without CDM) based on receiving signaling from a UE 115 indicating one or both of a measured frequency selectivity of a channel between the UE 115 and the base station 105 or a recommended DMRS port multiplexing pattern.

The DMRS port multiplexing pattern 300 may be an example of a configuration type 1 DMRS port pattern in which DMRS is located in 1 OFDM symbol (e.g., symbol 2) of a resource block (which may include 12 subcarriers and 14 OFDM symbols). The DMRS port multiplexing pattern 300 may refer to an FDM of a DMRS port 1000 and a DMRS port 1002 in a first layer 305 and an FDM of a DMRS port 1001 and a DMRS port 1003 in a second layer 310. As described herein, including in more detail with reference to FIG. 2, the base station 105 may configure the DMRS port multiplexing pattern 300 with or without CDM of the DMRS ports 1000 and 1002 in the first layer 305 with DMRS ports 1001 and 1003 in the second layer 310 based on a frequency selectivity report or other signaling from the UE 115 that otherwise indicates one or both of a measured frequency selectivity or a recommended DMRS port multiplexing pattern.

In examples in which the signaling from the UE 115 indicates a relatively low frequency selectivity or recommends the DMRS port multiplexing pattern 300 with CDM, the base station 105 may transmit a configuration of the DMRS port multiplexing pattern 300 to the UE 115 including CDM. In such examples, a transmitting device (e.g., one of the UE 115 or the base station 105 based on whether an uplink or downlink DMRS is scheduled or whether or a PUSCH or a PDSCH transmission is scheduled) may frequency division multiplex the DMRS ports 1000 and 1002 in the first layer 305 and the DMRS ports 1001 and 1003 in the second layer 310 and may code division multiplex the first layer 305 with the second layer 310. Such CDM of the first layer 305 and the second layer 310 may be illustrated by differing sequences of pluses ("+") and minuses ("−") in resource elements carrying DMRS. For example, each resource element in symbol 2 of the first layer 305 may include a "+" while the resource elements in symbol 2 of the second layer 310 may be associated with a code domain pattern of "++−−." As shown in the DMRS port multiplexing pattern 300, the DMRS port 1000 may be code division multiplexed with the DMRS port 1001 and the DMRS port 1002 may be code division multiplexed with the DMRS port 1003.

Alternatively, in examples in which the signaling from the UE 115 indicates a relatively high frequency selectivity or recommends the DMRS port multiplexing pattern 300 without CDM, the base station 105 may transmit a configuration of the DMRS port multiplexing pattern 300 to the UE 115 without CDM. In such examples, the transmitting device may frequency division multiplex the DMRS ports 1000 and 1002 and the DMRS ports 1001 and 1003 and may refrain CDM the first layer 305 and the second layer 310. For example, the transmitting device may transmit DMRS over the DMRS port 1000 and the DMRS port 1002 and may refrain from transmitting DMRS over the DMRS port 1001 and the DMRS port 1003. Alternatively, the transmitting may transmit DMRS over the DMRS port 1001 and the DMRS port 1003 and may refrain from transmitting DMRS over the DMRS port 1000 and the DMRS port 1002.

FIG. 4 illustrates an example of a DMRS port multiplexing pattern 400 that supports techniques for providing UE-assistance for a selection of a DMRS port multiplexing pattern in accordance with aspects of the present disclosure. In some examples, a base station 105 may configure a DMRS port multiplexing pattern 400 (with or without CDM) based on receiving signaling from a UE 115 indicating one or both of a measured frequency selectivity of a channel between the UE 115 and the base station 105 or a recommended DMRS port multiplexing pattern.

The DMRS port multiplexing pattern 400 may be an example of a configuration type 2 DMRS port pattern in which DMRS is located in 1 OFDM symbol (e.g., symbol 2) of a resource block (which may include 12 subcarriers and 14 OFDM symbols). The DMRS port multiplexing pattern 400 may refer to an FDM of a DMRS port 1000, a DMRS port 1002, and a DMRS port 1004 in a first layer 405 and an FDM of a DMRS port 1001, a DMRS port 1003, and a DMRS port 1005 in a second layer 410. As described herein, including in more detail with reference to FIG. 2, the base station 105 may configure the DMRS port multiplexing pattern 400 with or without CDM of the first layer 405 and the second layer 410 based on a frequency selectivity report or other signaling from the UE 115 that otherwise indicates one or both of a measured frequency selectivity or a recommended DMRS port multiplexing pattern.

In examples in which the signaling from the UE 115 indicates a relatively low frequency selectivity or recommends the DMRS port multiplexing pattern 400 with CDM, the base station 105 may transmit a configuration of the DMRS port multiplexing pattern 400 to the UE 115 including CDM. In such examples, a transmitting device (e.g., one of the UE 115 or the base station 105 based on whether an uplink or downlink DMRS is scheduled or whether or PUSCH or a PDSCH is scheduled) may frequency division multiplex the DMRS ports 1000, 1002, and 1004 in the first layer 405 and the DMRS ports 1001, 1003 and 1005 in the second layer 410 and may code division multiplex the first layer 405 with the second layer 410. Such CDM of the first layer 405 and the second layer 410 is illustrated by differing sequences of pluses ("+") and minuses ("−") in resource elements carrying DMRS. For example, each resource element in symbol 2 of the first layer 405 may include a "+" while the resource elements in symbol 2 of the second layer 410 may be associated with a code domain pattern of "+−+−." As shown in the DMRS port multiplexing pattern 400, the DMRS port 1000 may be code division multiplexed with the DMRS port 1001, the DMRS port 1002 may be code division multiplexed with the DMRS port 1003, and the DMRS port 1004 may be code division multiplexed with the DMRS port 1005.

Alternatively, in examples in which the signaling from the UE 115 indicates a relatively high frequency selectivity or recommends the DMRS port multiplexing pattern 400 without CDM, the base station 105 may transmit a configuration of the DMRS port multiplexing pattern 400 to the UE 115 without CDM. In such examples, the transmitting device may frequency division multiplex the DMRS ports 1000, 1002, and 1004 in the first layer 405 and the DMRS ports 1001, 1003, and 1005 in the second layer 410 and may refrain CDM the first layer 405 and the second layer 410. For example, the transmitting device may transmit DMRS over the DMRS ports 1000, 1002, and 1004 and may refrain from transmitting DMRS over the DMRS ports 1001, 1003, and 1005. Alternatively, the transmitting may transmit DMRS over the DMRS ports 1001, 1003, and 1005 and may refrain from transmitting DMRS over the DMRS ports 1000, 1002, and 1004.

Figure 5:
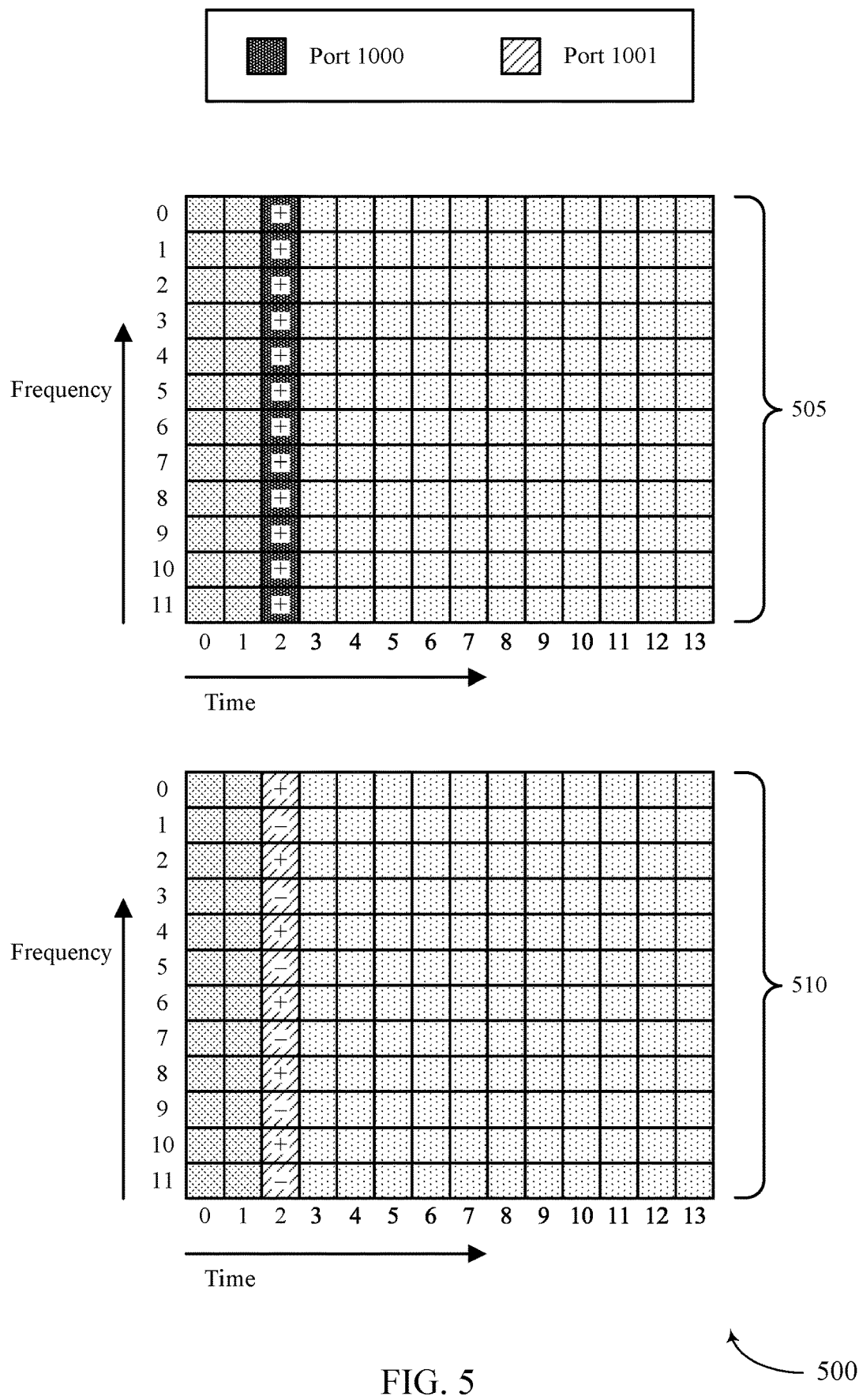

FIG. 5 illustrates an example of a DMRS port multiplexing pattern 500 that supports techniques for providing UE-assistance for a selection of a DMRS port multiplexing pattern in accordance with aspects of the present disclosure. In some examples, a base station 105 may configure a DMRS port multiplexing pattern 500 to maintain or improve channel estimation accuracy in examples in which a channel between a UE 115 and the base station 105 has a relatively higher frequency selectivity.

The DMRS port multiplexing pattern 500 illustrates how a transmitting device (e.g., one of the UE 115 or the base station 105 based on whether an uplink or downlink DMRS is scheduled or whether or PUSCH or a PDSCH is scheduled) may transmit a DMRS for a same DMRS port over all resource elements of a symbol. For example, the transmitting device may transmit a DMRS over a DMRS port 1000 over all resource elements in a symbol 2 of a resource block (which may include 12 subcarriers and 14 OFDM symbols) in a first layer 505 and may transmit a DMRS for a DMRS port 1001 over all resource elements in the symbol 2 of the resource block in a second layer 510. In some aspects, the transmitting device may multiplex the DMRS port 1000 and the DMRS port 1001 in the code domain, as illustrated by differing sequences of pluses ("+") and minuses ("−") in resource elements carrying DMRS in the first layer 505 and the second layer 510. As shown in the DMRS port multiplexing pattern 500, each resource element in symbol 2 of the first layer 505 may include a "+" while the resource elements in symbol 2 of the second layer 510 may be associated with a code domain pattern of "+−+−."

Further, based on including DMRS on all resource elements in a symbol period, the distance between resource elements in a same CDM group may be reduced (as compared to DMRS port multiplexing patterns including FDM), which may maintain orthogonality of multiplexed DMRS ports (e.g., in highly frequency selective channel conditions). Additionally, due to the increased frequency density of the resource elements including DMRS, frequency domain interpolation and smoothing of channel may become more accurate as part of a channel estimation procedure. Accordingly, in some examples, the UE 115 may recommend the DMRS port multiplexing pattern 500 via the frequency selectivity report or the base station 105 may otherwise select to configure the DMRS port multiplexing pattern 500 at the UE 115 in examples in which the frequency selectivity of the channel between the UE 115 and the base station 105 is relatively high.

Figure 6:
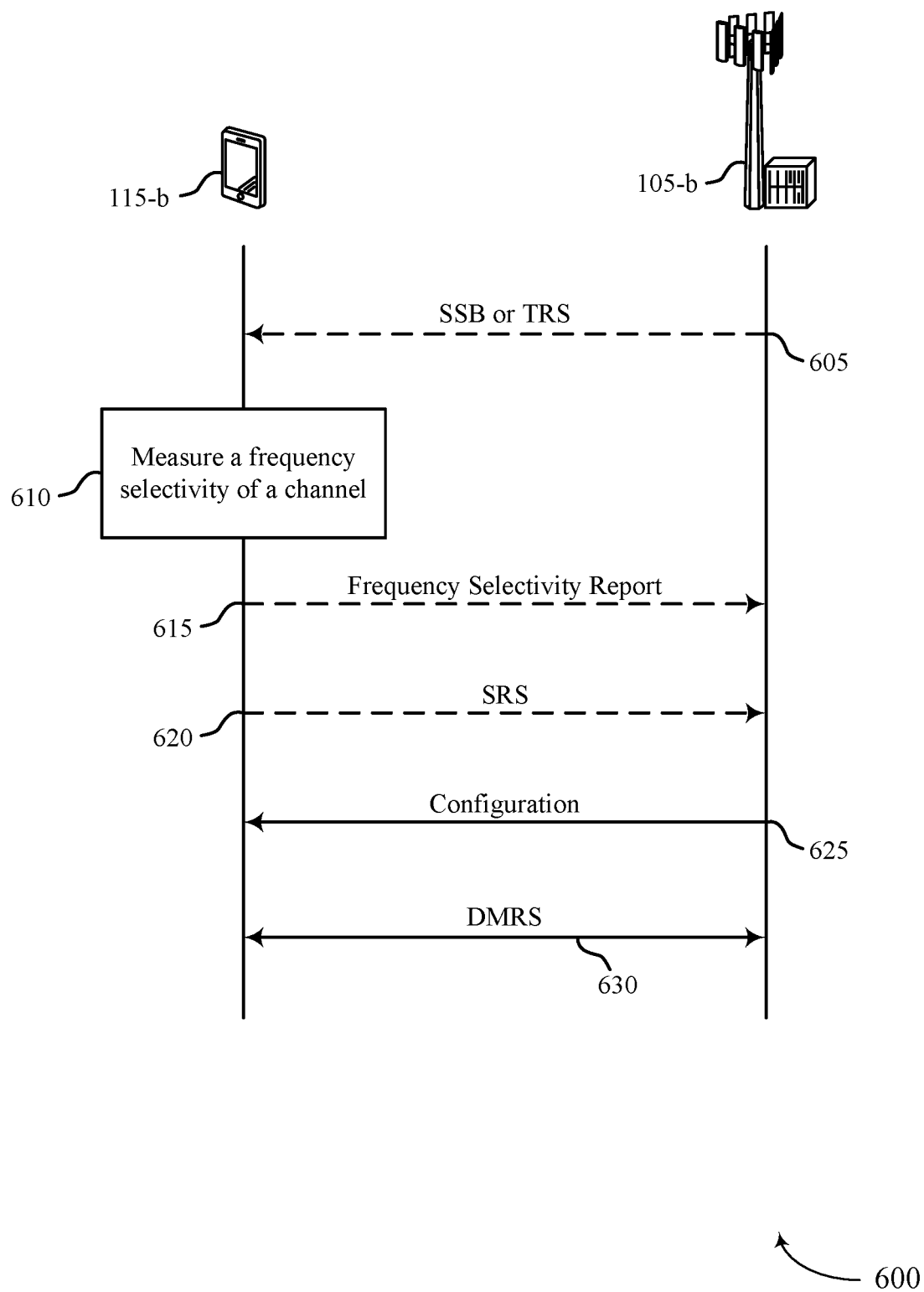
FIG. 6 illustrates an example of a process flow that supports techniques for providing UE-assistance for a selection of a DMRS port multiplexing pattern in accordance with aspects of the present disclosure.

FIG. 6 illustrates an example of a process flow 600 that supports techniques for providing UE-assistance for a selection of a DMRS port multiplexing pattern in accordance with aspects of the present disclosure. The process flow 600 may implement or be implemented to realize aspects of the wireless communications system 100 or the wireless communications system 200. For example, the process flow 600 may illustrate communication between a UE 115-*b* and a base station 105-*b*, which may be examples of corresponding devices described herein, including with reference to FIGS. 1 and 2. In some examples, the UE 115-*b* may transmit, to the base station 105-*b*, signaling indicating one or both of a frequency selectivity metric or a DMRS port multiplexing pattern based on a frequency selectivity of a channel between the UE 115-*b* and the base station 105-*b*.

In the following description of the process flow 600, the operations may be performed (e.g., reported or provided) in a different order than the order shown, or the operations performed by the UE 115-*b* and the base station 105-*b* may be performed in different orders or at different times. For example, specific operations may also be left out of the process flow 600, or other operations may be added to the process flow 600. Further, although some operations or signaling may be shown to occur at different times for discussion purposes, these operations may actually occur at the same time.

At 605, the base station 105-*b* may transmit one or both of an SSB or a TRS. Accordingly, the UE 115-*b* may receive one or both of the SSB or the TRS.

At 610, the UE 115-*b* may measure a frequency selectivity of a channel between the UE 115-*b* and the base station 105-*b*. In some examples, the UE 115-*b* may measure the frequency selectivity based on one or both of the SSB or the TRS.

The UE 115-*b*, based on measuring the frequency selectivity of the channel, may obtain a frequency selectivity metric based on the measured frequency selectivity and may transmit signaling to the base station 105-*b* indicating one or both of the frequency selectivity metric or a DMRS port multiplexing pattern based on measuring the frequency selectivity of the channel. In some examples, such signaling may include a frequency selectivity report. In some other examples, such signaling may include an SRS, HARQ feedback, or other uplink signaling.

At 615, in some implementations, the UE 115-*b* may transmit a frequency selectivity report to the base station 105-*b* indicating one or both of the frequency selectivity metric or the DMRS port multiplexing pattern based on measuring the frequency selectivity of the channel. In examples in which the frequency selectivity report includes an indication of the DMRS port multiplexing pattern, the UE 115-*b* may transmit the indication of the DMRS port multiplexing pattern as a recommendation to assist the base station 105-*b* in selection of a DMRS port multiplexing pattern based on the current channel conditions between the UE 115-*b* and the base station 105-*b*. Additional details relating to such a recommendation based on current channel conditions are described herein, including with reference to FIG. 2.

At 620, in some implementations, the UE 115-*b* may transmit an SRS indicating one or both of the frequency selectivity metric or the DMRS port multiplexing pattern. In such implementations, the base station 105-*b* may measure the SRS to identify or otherwise determine the frequency selectivity of the channel between the UE 115-*b* and the base station 105-*b*.

At 625, the UE 115-*b* may receive, from the base station 105-*b*, a configuration of the DMRS port multiplexing pattern based on the signaling. In some examples, the base station 105-*b* may select to configure the DMRS port multiplexing pattern based on the information provided to the base station 105-*b* via a frequency selectivity report or based on the information obtained by the base station 105-*b* based on measuring an SRS. In some implementations, the base station 105-*b* may configure the DMRS port multiplexing pattern with CDM if the frequency selectivity metric fails to satisfy (such as is less than) a threshold and may configure the DMRS port multiplexing pattern without CDM if the frequency selectivity metric satisfies (such as is greater than) the threshold.

At 630, the UE 115-*b* may transmit or receive a DMRS based on or according to the configured DMRS port multiplexing pattern. Based on implementing the techniques described herein, the UE 115-*b* and the base station 105-*b* may employ a DMRS port multiplexing pattern suited for the current channel conditions (such as channel frequency selectivity), which may enable the UE 115-*b* and the base station 105-*b* to dynamically prioritize reliability of channel estimation or system throughput based on the current channel conditions.

Figure 7:
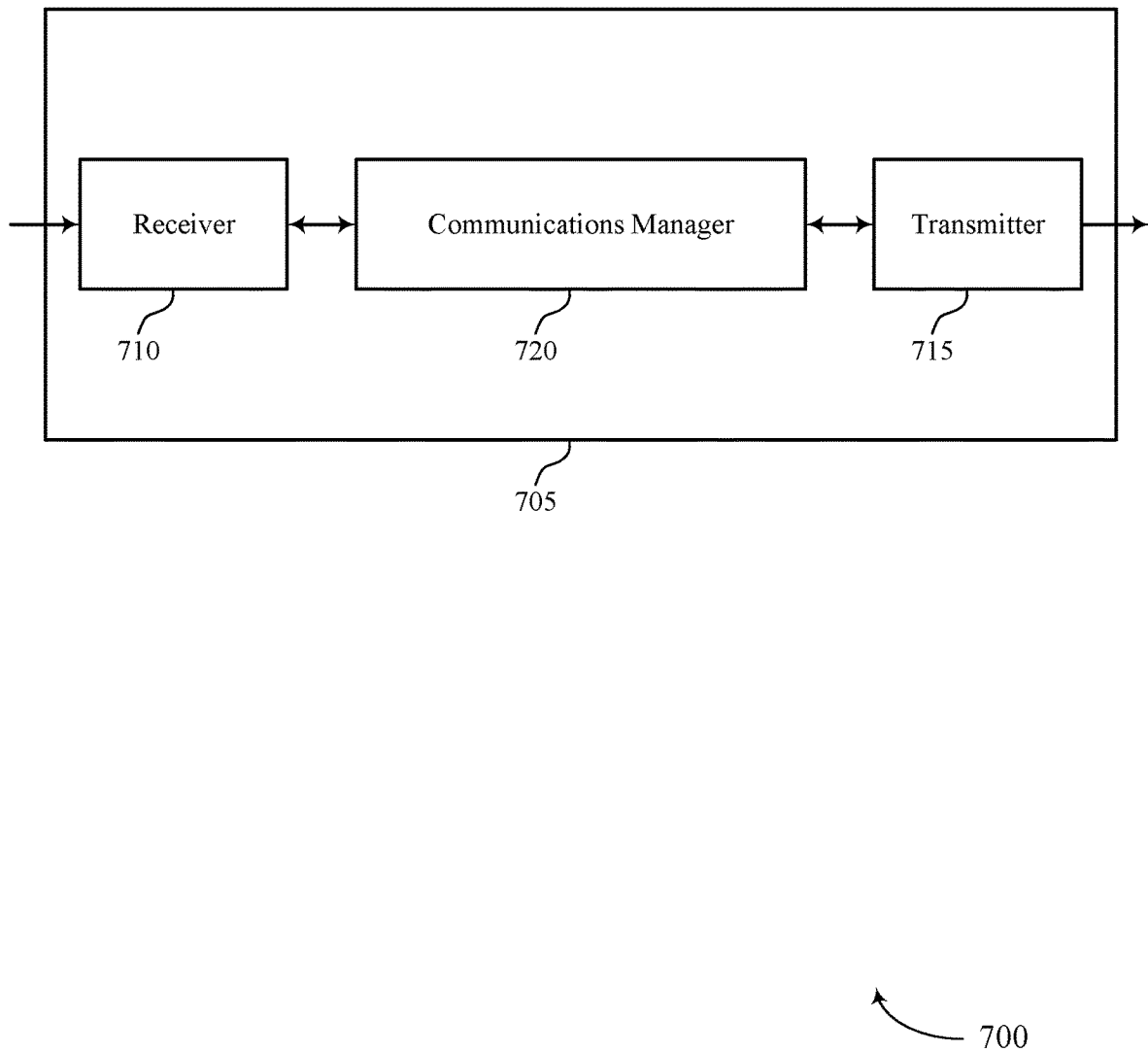
FIGS. 7 and 8 show block diagrams of devices that support techniques for providing UE-assistance for a selection of a DMRS port multiplexing pattern in accordance with aspects of the present disclosure.

FIG. 7 shows a block diagram 700 of a device 705 that supports techniques for providing UE-assistance for a selection of a DMRS port multiplexing pattern in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for providing UE-assistance for a selection of a DMRS port multiplexing pattern). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for providing UE-assistance for a selection of a DMRS port multiplexing pattern). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for providing UE-assistance for a selection of a DMRS port multiplexing pattern as described herein. For example, the communications manager 720, the receiver 710, the transmitter 715, or various combinations or components thereof may support a method for performing one or more of the functions described herein.

The communications manager 720, or its sub-components, may be implemented in hardware, software (e.g., executed by at least one processor), or any combination thereof. In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software) executed by a processor. If implemented in code executed by a processor, the functions of the communications manager 720, the receiver 710, the transmitter 715, or various combinations or components thereof may be performed by a general-purpose processor, a DSP, a central processing unit (CPU), a graphics processing unit (GPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for measuring a frequency selectivity of a channel between the UE and a base station. The communications manager 720 may be configured as or otherwise support a means for transmitting, to the base station, signaling indicating one or both of a frequency selectivity metric or a DMRS port multiplexing pattern based on the frequency selectivity of the channel. The communications manager 720 may be configured as or otherwise support a means for receiving, from the base station, a configuration of the DMRS port multiplexing pattern based on the signaling.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for more reliable channel estimation, greater throughput, and more efficient utilization of communication resources.

Figure 8:
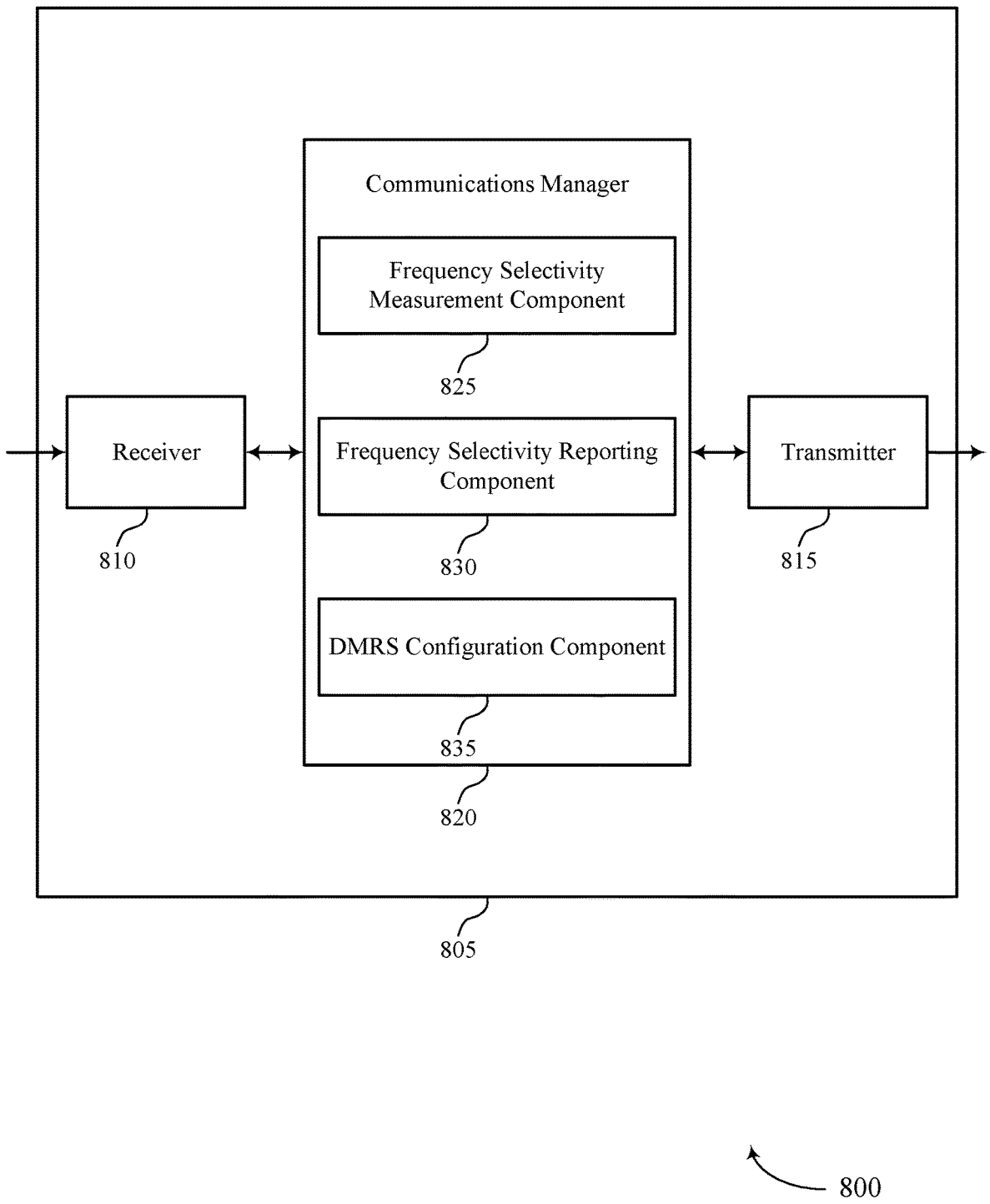

FIG. 8 shows a block diagram 800 of a device 805 that supports techniques for providing UE-assistance for a selection of a DMRS port multiplexing pattern in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for providing UE-assistance for a selection of a DMRS port multiplexing pattern). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for providing UE-assistance for a selection of a DMRS port multiplexing pattern). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for providing UE-assistance for a selection of a DMRS port multiplexing pattern as described herein. For example, the communications manager 820 may include a frequency selectivity measurement component 825, a frequency selectivity reporting component 830, a DMRS configuration component 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The frequency selectivity measurement component 825 may be configured as or otherwise support a means for measuring a frequency selectivity of a channel between the UE and a base station. The frequency selectivity reporting component 830 may be configured as or otherwise support a means for transmitting, to the base station, signaling indicating one or both of a frequency selectivity metric or a DMRS port multiplexing pattern based on the frequency selectivity of the channel. The DMRS configuration component 835 may be configured as or otherwise support a means for receiving, from the base station, a configuration of the DMRS port multiplexing pattern based on the signaling.

Figure 9:
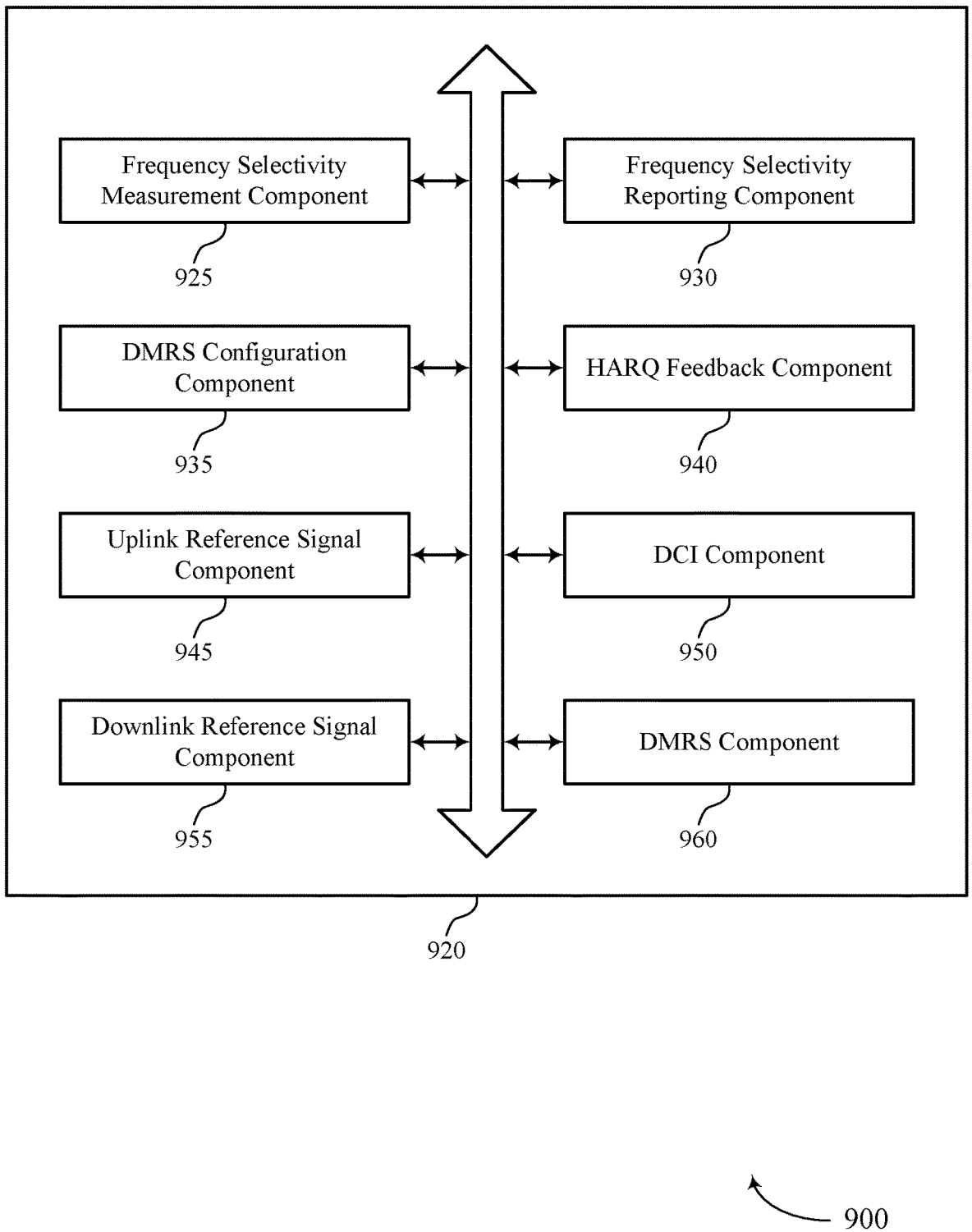
FIG. 9 shows a block diagram of a communications manager that supports techniques for providing UE-assistance for a selection of a DMRS port multiplexing pattern in accordance with aspects of the present disclosure.

FIG. 9 shows a block diagram 900 of a communications manager 920 that supports techniques for providing UE-assistance for a selection of a DMRS port multiplexing pattern in accordance with aspects of the present disclosure. The communications manager 920 may be an example of aspects of a communications manager 720, a communications manager 820, or both, as described herein. The communications manager 920, or various components thereof, may be an example of means for performing various aspects of techniques for providing UE-assistance for a selection of a DMRS port multiplexing pattern as described herein. For example, the communications manager 920 may include a frequency selectivity measurement component 925, a frequency selectivity reporting component 930, a DMRS configuration component 935, an HARQ feedback component 940, an uplink reference signal component 945, a DCI component 950, a downlink reference signal component 955, a DMRS component 960, or any combination thereof. Each of these components may communicate, directly or indirectly, with one another (e.g., via one or more buses).

The communications manager 920 may support wireless communication at a UE in accordance with examples as disclosed herein. The frequency selectivity measurement component 925 may be configured as or otherwise support a means for measuring a frequency selectivity of a channel between the UE and a base station. The frequency selectivity reporting component 930 may be configured as or otherwise support a means for transmitting, to the base station, signaling indicating one or both of a frequency selectivity metric or a DMRS port multiplexing pattern based on the frequency selectivity of the channel. The DMRS configuration component 935 may be configured as or otherwise support a means for receiving, from the base station, a configuration of the DMRS port multiplexing pattern based on the signaling.

In some examples, to support transmitting the signaling indicating one or both of the frequency selectivity metric or the DMRS port multiplexing pattern, the frequency selectivity reporting component 930 may be configured as or otherwise support a means for transmitting a CSI report including an indication of one or both of the frequency selectivity metric or the DMRS port multiplexing pattern. In some examples, the CSI report includes a bit indicating one of a presence or an absence of CDM in the DMRS port multiplexing pattern.

In some examples, to support transmitting the signaling indicating one or both of the frequency selectivity metric or the DMRS port multiplexing pattern, the frequency selectivity reporting component 930 may be configured as or otherwise support a means for transmitting one or more of UCI, a MAC-CE, or an RRC information element associated with UE assistance information including an indication of one or both of the frequency selectivity metric or the DMRS port multiplexing pattern.

In some examples, to support transmitting the signaling indicating one or both of the frequency selectivity metric or the DMRS port multiplexing pattern, the HARQ feedback component 940 may be configured as or otherwise support a means for transmitting a HARQ feedback message indicating one or both of the frequency selectivity metric or the DMRS port multiplexing pattern.

In some examples, to support transmitting the signaling indicating one or both of the frequency selectivity metric or the DMRS port multiplexing pattern, the uplink reference signal component 945 may be configured as or otherwise support a means for transmitting an SRS indicating one or both of the frequency selectivity metric or the DMRS port multiplexing pattern.

In some examples, to support receiving the configuration of the DMRS port multiplexing pattern, the DCI component 950 may be configured as or otherwise support a means for receiving DCI scheduling one or more ports of the UE for a DMRS and indicating whether the one or more ports of the UE are code division multiplexed with a second one or more ports of a second UE. In some examples, to support receiving the configuration of the DMRS port multiplexing pattern, the DMRS configuration component 935 may be configured as or otherwise support a means for receiving configuration signaling associated with one or more ports of the UE used for a DMRS and indicating whether the one or more ports of the UE are code division multiplexed with a second one or more ports of a second UE.

In some examples, to support transmitting the signaling indicating one or both of the frequency selectivity metric or the DMRS port multiplexing pattern, the frequency selectivity reporting component 930 may be configured as or otherwise support a means for transmitting an indication of a first DMRS port multiplexing pattern associated with an absence of CDM based on the frequency selectivity satisfying the threshold. In some examples, the DMRS component 960 may be configured as or otherwise support a means for transmitting or receiving a DMRS across one or more ports of the UE based on the first DMRS port multiplexing pattern associated with the absence of CDM.

In some examples, to support transmitting the signaling indicating one or both of the frequency selectivity metric or the DMRS port multiplexing pattern, the frequency selectivity reporting component 930 may be configured as or otherwise support a means for transmitting an indication of a second DMRS port multiplexing pattern associated with CDM based on the frequency selectivity failing to satisfy the threshold. In some examples, the DMRS component 960 may be configured as or otherwise support a means for transmitting or receiving a DMRS across one or more ports of the UE based on the second DMRS port multiplexing pattern associated with the CDM.

In some examples, to support measuring the frequency selectivity of the channel between the UE and the base station, the downlink reference signal component 955 may be configured as or otherwise support a means for receiving, from the base station, one or both of an SSB or a TRS. In some examples, to support measuring the frequency selectivity of the channel between the UE and the base station, the frequency selectivity measurement component 925 may be configured as or otherwise support a means for measuring the frequency selectivity based on one or both of the SSB or the TRS.

In some examples, the frequency selectivity metric includes an RMS delay spread and the DMRS port multiplexing pattern includes a subset of a set of indices of a table of DMRS port multiplexing patterns.

Figure 10:
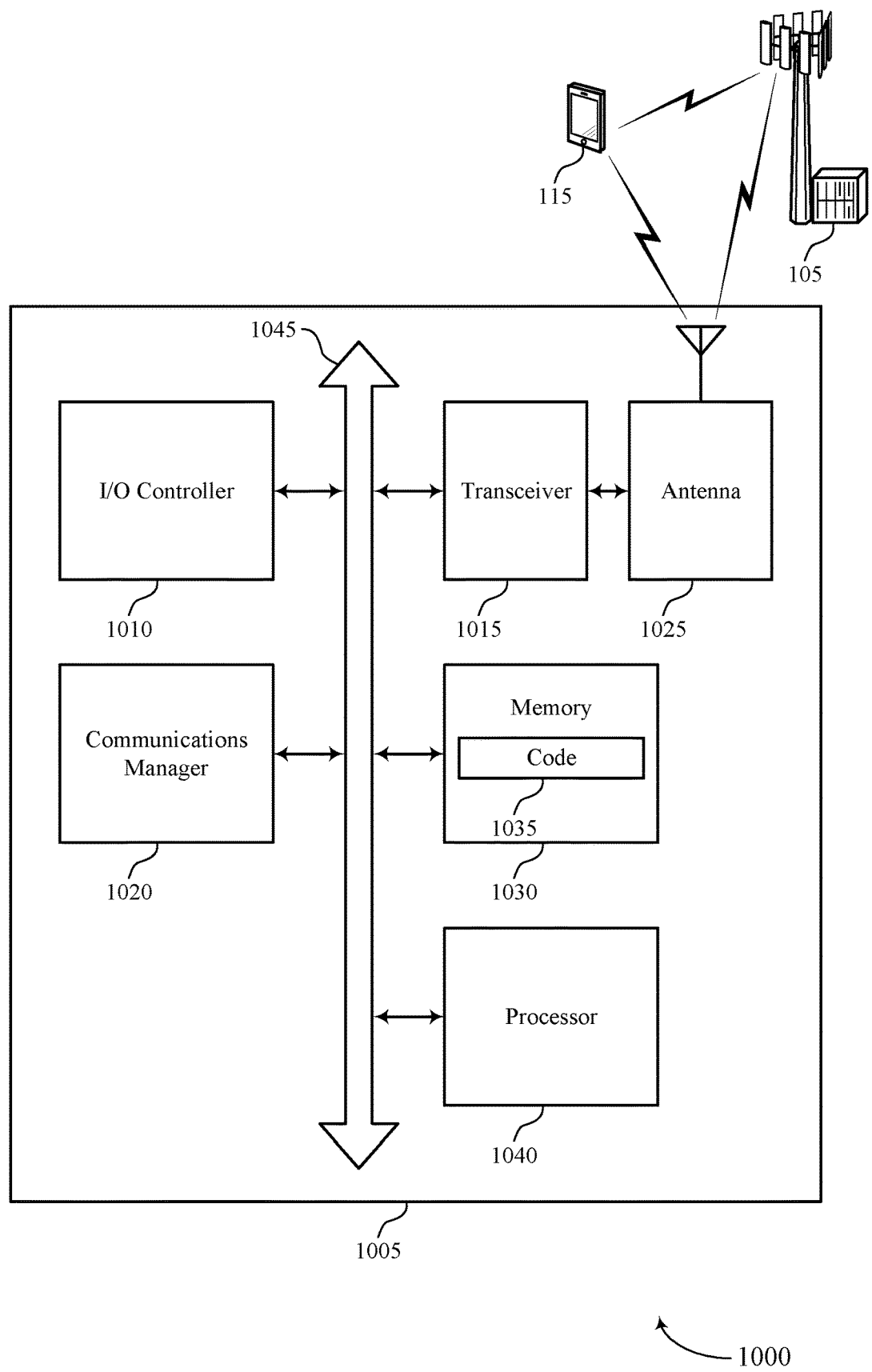
FIG. 10 shows a diagram of a system including a device that supports techniques for providing UE-assistance for a selection of a DMRS port multiplexing pattern in accordance with aspects of the present disclosure.

FIG. 10 shows a diagram of a system 1000 including a device 1005 that supports techniques for providing UE-assistance for a selection of a DMRS port multiplexing pattern in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for providing UE-assistance for a selection of a DMRS port multiplexing pattern). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for measuring a frequency selectivity of a channel between the UE and a base station. The communications manager 1020 may be configured as or otherwise support a means for transmitting, to the base station, signaling indicating one or both of a frequency selectivity metric or a DMRS port multiplexing pattern based on the frequency selectivity of the channel. The communications manager 1020 may be configured as or otherwise support a means for receiving, from the base station, a configuration of the DMRS port multiplexing pattern based on the signaling.

By including or configuring the communications manager 1020 in accordance with examples as described herein, the device 1005 may support techniques for improved communication reliability, reduced power consumption, more efficient utilization of communication resources, improved coordination between devices, longer battery life, improved utilization of processing capability, and greater throughput. Further, the described techniques may support dynamic prioritization of channel estimation reliability and system throughput based on current channel conditions (e.g., current channel frequency selectivity).

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for providing UE-assistance for a selection of a DMRS port multiplexing pattern as described herein, or the processor 1040 and the memory 1030 may be otherwise configured to perform or support such operations.

Figure 11:
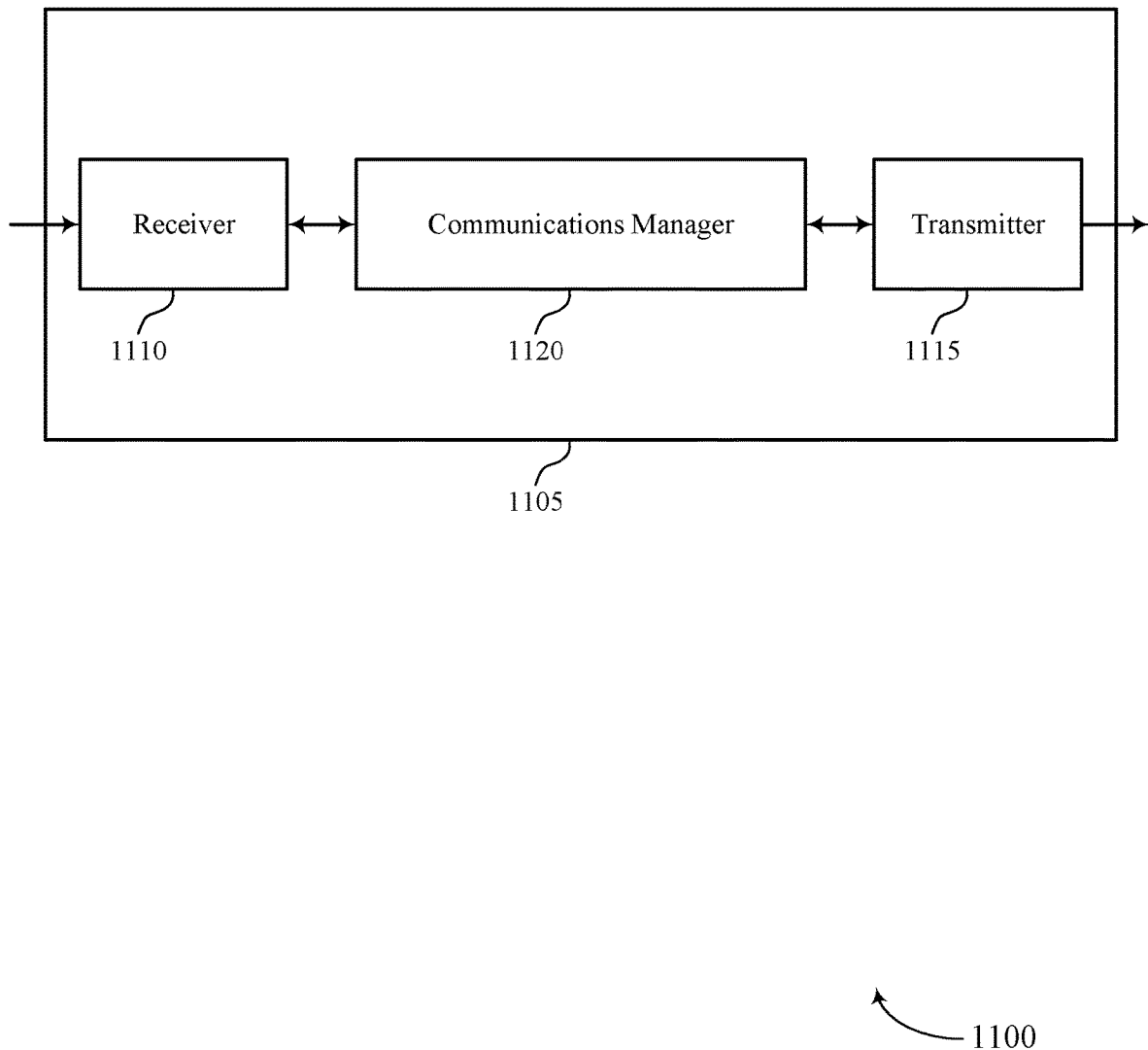
FIGS. 11 and 12 show block diagrams of devices that support techniques for providing UE-assistance for a selection of a DMRS port multiplexing pattern in accordance with aspects of the present disclosure.

FIG. 11 shows a block diagram 1100 of a device 1105 that supports techniques for providing UE-assistance for a selection of a DMRS port multiplexing pattern in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for providing UE-assistance for a selection of a DMRS port multiplexing pattern). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for providing UE-assistance for a selection of a DMRS port multiplexing pattern). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for providing UE-assistance for a selection of a DMRS port multiplexing pattern as described herein. For example, the communications manager 1120, the receiver 1110, the transmitter 1115, or various combinations or components thereof may support a method for performing one or more of the functions described herein.

The communications manager 1120, or its sub-components, may be implemented to in hardware, software (e.g., executed by at least one processor), or any combination thereof. In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software) executed by a processor. If implemented in code executed by a processor, the functions of the communications manager 1120, the receiver 1110, the transmitter 1115, or various combinations or components thereof may be performed by a general-purpose processor, a DSP, a CPU, a GPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. For example, the communications manager 1120 may be configured as or otherwise support a means for receiving, from a UE, signaling indicating one or both of a frequency selectivity metric or a DMRS port multiplexing pattern based on a frequency selectivity of a channel between the UE and the base station. The communications manager 1120 may be configured as or otherwise support a means for transmitting, to the UE, a configuration of the DMRS port multiplexing pattern based on the signaling. The communications manager 1120 may be configured as or otherwise support a means for transmitting or receiving a DMRS to or from one or more ports of the UE based on the DMRS port multiplexing pattern.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for more reliability, greater throughput, and more efficient utilization of communication resources.

Figure 12:
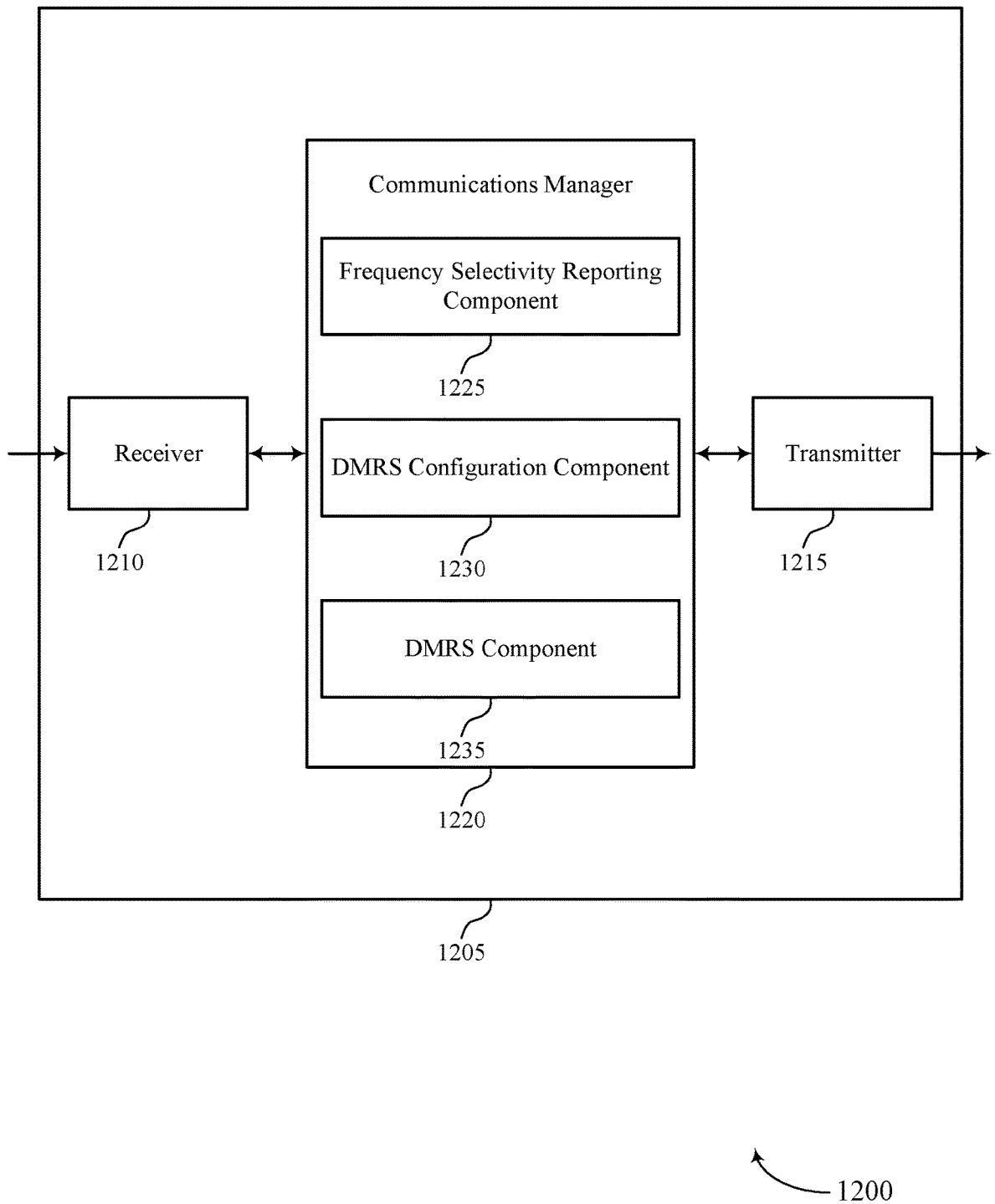

FIG. 12 shows a block diagram 1200 of a device 1205 that supports techniques for providing UE-assistance for a selection of a DMRS port multiplexing pattern in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for providing UE-assistance for a selection of a DMRS port multiplexing pattern). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for providing UE-assistance for a selection of a DMRS port multiplexing pattern). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for providing UE-assistance for a selection of a DMRS port multiplexing pattern as described herein. For example, the communications manager 1220 may include a frequency selectivity reporting component 1225, a DMRS configuration component 1230, a DMRS component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. The frequency selectivity reporting component 1225 may be configured as or otherwise support a means for receiving, from a UE, signaling indicating one or both of a frequency selectivity metric or a DMRS port multiplexing pattern based on a frequency selectivity of a channel between the UE and the base station. The DMRS configuration component 1230 may be configured as or otherwise support a means for transmitting, to the UE, a configuration of the DMRS port multiplexing pattern based on the signaling. The DMRS component 1235 may be configured as or otherwise support a means for transmitting or receiving a DMRS to or from one or more ports of the UE based on the DMRS port multiplexing pattern.

Figure 13:
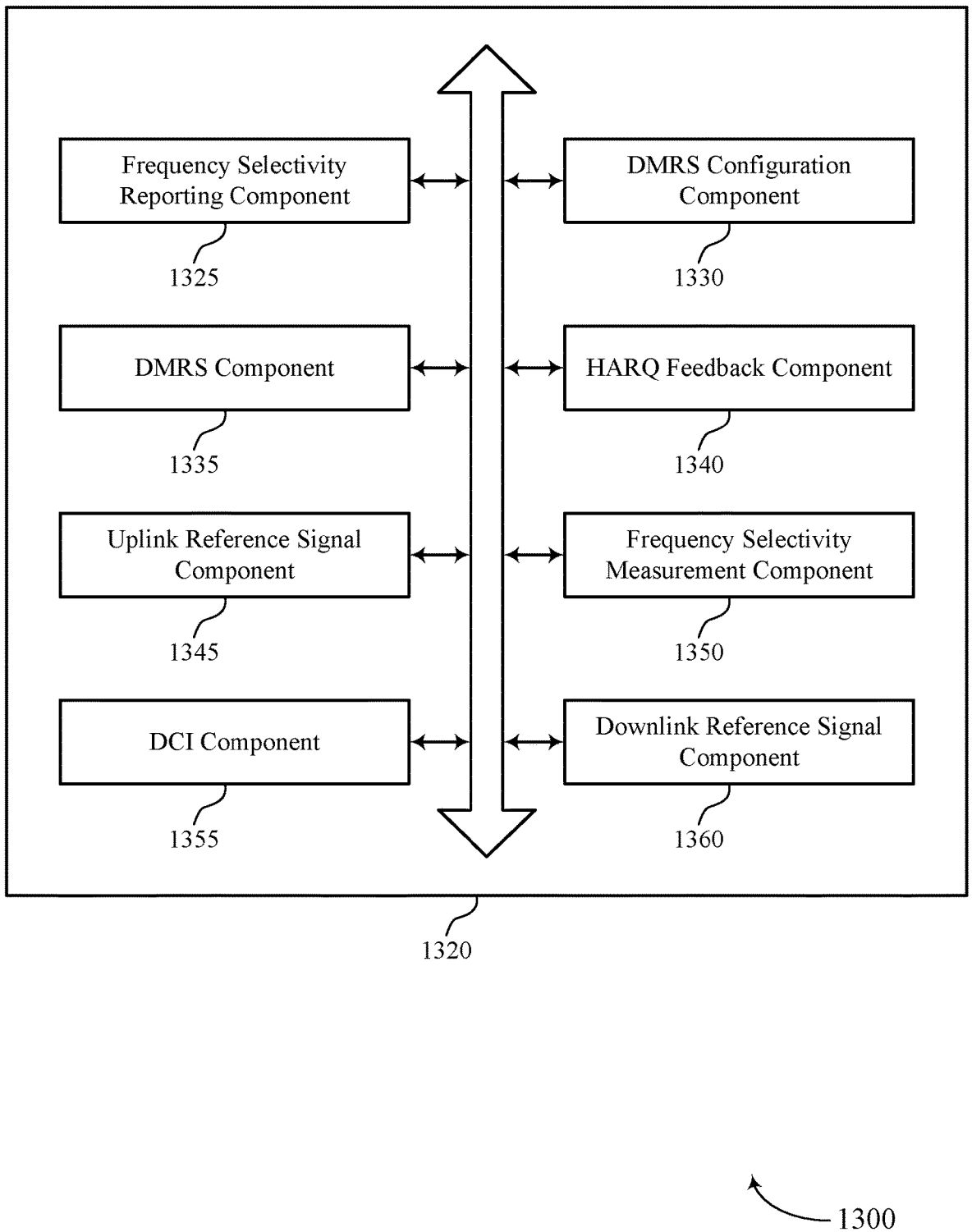
FIG. 13 shows a block diagram of a communications manager that supports techniques for providing UE-assistance for a selection of a DMRS port multiplexing pattern in accordance with aspects of the present disclosure.

FIG. 13 shows a block diagram 1300 of a communications manager 1320 that supports techniques for providing UE-assistance for a selection of a DMRS port multiplexing pattern in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of techniques for providing UE-assistance for a selection of a DMRS port multiplexing pattern as described herein. For example, the communications manager 1320 may include a frequency selectivity reporting component 1325, a DMRS configuration component 1330, a DMRS component 1335, an HARQ feedback component 1340, an uplink reference signal component 1345, a frequency selectivity measurement component 1350, a DCI component 1355, a downlink reference signal component 1360, or any combination thereof. Each of these components may communicate, directly or indirectly, with one another (e.g., via one or more buses).

The communications manager 1320 may support wireless communication at a base station in accordance with examples as disclosed herein. The frequency selectivity reporting component 1325 may be configured as or otherwise support a means for receiving, from a UE, signaling indicating one or both of a frequency selectivity metric or a DMRS port multiplexing pattern based on a frequency selectivity of a channel between the UE and the base station. The DMRS configuration component 1330 may be configured as or otherwise support a means for transmitting, to the UE, a configuration of the DMRS port multiplexing pattern based on the signaling. The DMRS component 1335 may be configured as or otherwise support a means for transmitting or receiving a DMRS to or from one or more ports of the UE based on the DMRS port multiplexing pattern.

In some examples, to support receiving the signaling indicating one or both of the frequency selectivity metric or the DMRS port multiplexing pattern, the frequency selectivity reporting component 1325 may be configured as or otherwise support a means for receiving a CSI report including an indication of one or both of the frequency selectivity metric or the DMRS port multiplexing pattern. In some examples, the CSI report includes a bit indicating one of a presence or an absence of CDM in the DMRS port multiplexing pattern.

In some examples, to support receiving the signaling indicating one or both of the frequency selectivity metric or the DMRS port multiplexing pattern, the frequency selectivity reporting component 1325 may be configured as or otherwise support a means for receiving one or more of UCI, a MAC-CE, or an RRC information element associated with UE assistance information including an indication of one or both of the frequency selectivity metric or the DMRS port multiplexing pattern.

In some examples, to support receiving the signaling indicating one or both of the frequency selectivity metric or the DMRS port multiplexing pattern, the HARQ feedback component 1340 may be configured as or otherwise support a means for receiving a HARQ feedback message. In some examples, to support receiving the signaling indicating one or both of the frequency selectivity metric or the DMRS port multiplexing pattern, the DMRS configuration component 1330 may be configured as or otherwise support a means for selecting the DMRS port multiplexing pattern based on the HARQ feedback message.

In some examples, to support receiving the signaling indicating one or both of the frequency selectivity metric or the DMRS port multiplexing pattern, the uplink reference signal component 1345 may be configured as or otherwise support a means for receiving an SRS. In some examples, to support receiving the signaling indicating one or both of the frequency selectivity metric or the DMRS port multiplexing pattern, the frequency selectivity measurement component 1350 may be configured as or otherwise support a means for measuring the frequency selectivity based on the SRS. In some examples, to support receiving the signaling indicating one or both of the frequency selectivity metric or the DMRS port multiplexing pattern, the DMRS configuration component 1330 may be configured as or otherwise support a means for selecting the DMRS port multiplexing pattern based on the frequency selectivity.

In some examples, to support transmitting the configuration of the DMRS port multiplexing pattern, the DCI component 1355 may be configured as or otherwise support a means for transmitting DCI scheduling one or more ports of the UE for the DMRS and indicating whether the one or more ports of the UE are code division multiplexed with a second one or more ports of a second UE. In some examples, to support transmitting the configuration of the DMRS port multiplexing pattern, the DMRS configuration component 1330 may be configured as or otherwise support a means for transmitting configuration signaling associated with the one or more ports of the UE used for the DMRS and indicating whether the one or more ports of the UE are code division multiplexed with a second one or more ports of a second UE.

In some examples, to support receiving the signaling indicating one or both of the frequency selectivity metric or the DMRS port multiplexing pattern, the frequency selectivity reporting component 1325 may be configured as or otherwise support a means for receiving an indication of a first DMRS port multiplexing pattern associated with an absence of CDM based on the frequency selectivity satisfying the threshold. In some examples, to support transmitting or receiving the DMRS to the one or more ports of the UE based on the DMRS port multiplexing pattern, the DMRS component 1335 may be configured as or otherwise support a means for transmitting or receiving the DMRS to the one or more ports of the UE based on the first DMRS port multiplexing pattern associated with the absence of CDM.

In some examples, to support receiving the signaling indicating one or both of the frequency selectivity metric or the DMRS port multiplexing pattern, the frequency selectivity reporting component 1325 may be configured as or otherwise support a means for receiving an indication of a second DMRS port multiplexing pattern associated with CDM based on the frequency selectivity failing to satisfy the threshold. In some examples, to support transmitting or receiving the DMRS to the one or more ports of the UE based on the DMRS port multiplexing pattern, the DMRS component 1335 may be configured as or otherwise support a means for transmitting or receiving the DMRS to the one or more ports of the UE based on the second DMRS port multiplexing pattern associated with the CDM.

In some examples, the downlink reference signal component 1360 may be configured as or otherwise support a means for transmitting, to the UE, one or both of an SSB or a TRS, where receiving the signaling indicating one or both of the frequency selectivity metric or the DMRS port multiplexing pattern is based on transmitting one or both of the SSB or the TRS.

In some examples, the frequency selectivity metric includes an RMS delay spread and the DMRS port multiplexing pattern includes a subset of a set of indices of a table of DMRS port multiplexing patterns.

Figure 14:
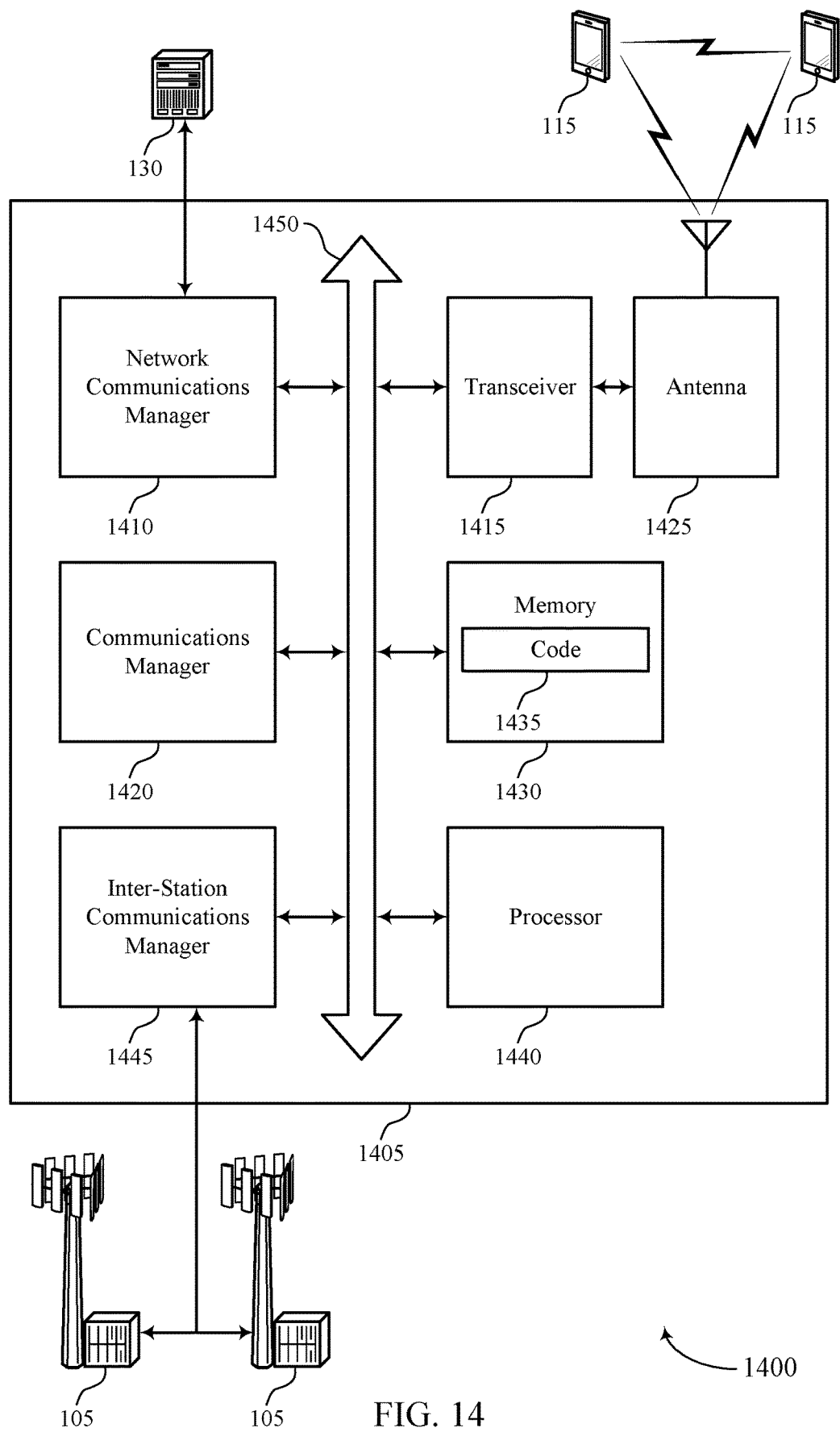
FIG. 14 shows a diagram of a system including a device that supports techniques for providing UE-assistance for a selection of a DMRS port multiplexing pattern in accordance with aspects of the present disclosure.

FIG. 14 shows a diagram of a system 1400 including a device 1405 that supports techniques for providing UE-assistance for a selection of a DMRS port multiplexing pattern in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for providing UE-assistance for a selection of a DMRS port multiplexing pattern). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105 and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a base station in accordance with examples as disclosed herein. For example, the communications manager 1420 may be configured as or otherwise support a means for receiving, from a UE, signaling indicating one or both of a frequency selectivity metric or a DMRS port multiplexing pattern based on a frequency selectivity of a channel between the UE and the base station. The communications manager 1420 may be configured as or otherwise support a means for transmitting, to the UE, a configuration of the DMRS port multiplexing pattern based on the signaling. The communications manager 1420 may be configured as or otherwise support a means for transmitting or receiving a DMRS to or from one or more ports of the UE based on the DMRS port multiplexing pattern.

By including or configuring the communications manager 1420 in accordance with examples as described herein, the device 1405 may support techniques for improved communication reliability, reduced latency, reduced power consumption, more efficient utilization of communication resources, improved coordination between devices, longer battery life, and improved utilization of processing capability. Further, the described techniques provide for dynamic prioritization of channel estimation reliability and system throughput based on current channel conditions (e.g., channel frequency selectivity).

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for providing UE-assistance for a selection of a DMRS port multiplexing pattern as described herein, or the processor 1440 and the memory 1430 may be otherwise configured to perform or support such operations.

Figure 15:
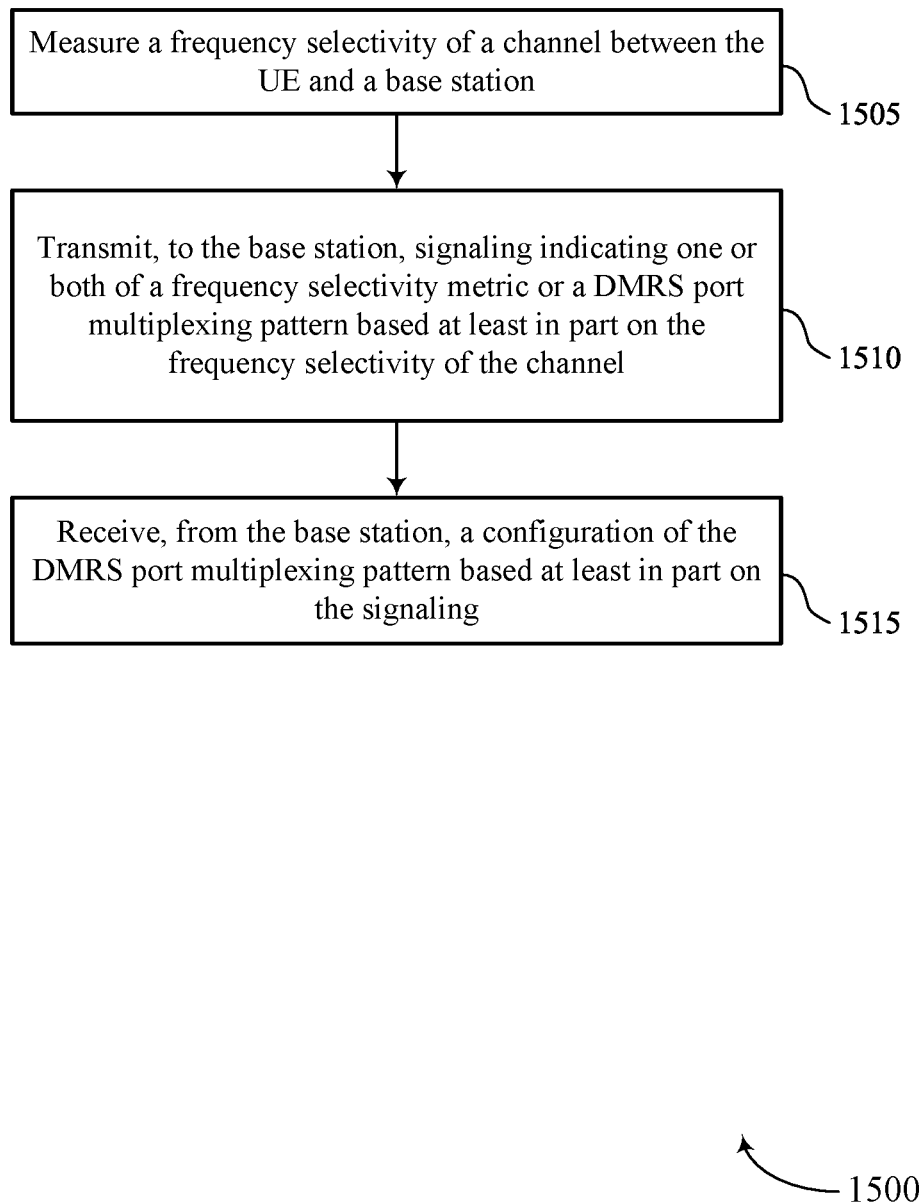
FIGS. 15 and 16 show flowcharts illustrating methods that support techniques for providing UE-assistance for a selection of a DMRS port multiplexing pattern in accordance with aspects of the present disclosure.

FIG. 15 shows a flowchart illustrating a method 1500 that supports techniques for providing UE-assistance for a selection of a DMRS port multiplexing pattern in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include measuring a frequency selectivity of a channel between the UE and a base station. The operations of 1505 may be performed in accordance with examples as disclosed herein. In some examples, aspects of the operations of 1505 may be performed by a frequency selectivity measurement component 925 as described with reference to FIG. 9.

At 1510, the method may include transmitting, to the base station, signaling indicating one or both of a frequency selectivity metric or a DMRS port multiplexing pattern based at least in part on the frequency selectivity of the channel. The operations of 1510 may be performed in accordance with examples as disclosed herein. In some examples, aspects of the operations of 1510 may be performed by a frequency selectivity reporting component 930 as described with reference to FIG. 9.

At 1515, the method may include receiving, from the base station, a configuration of the DMRS port multiplexing pattern based at least in part on the signaling. The operations of 1515 may be performed in accordance with examples as disclosed herein. In some examples, aspects of the operations of 1515 may be performed by a DMRS configuration component 935 as described with reference to FIG. 9.

Figure 16:
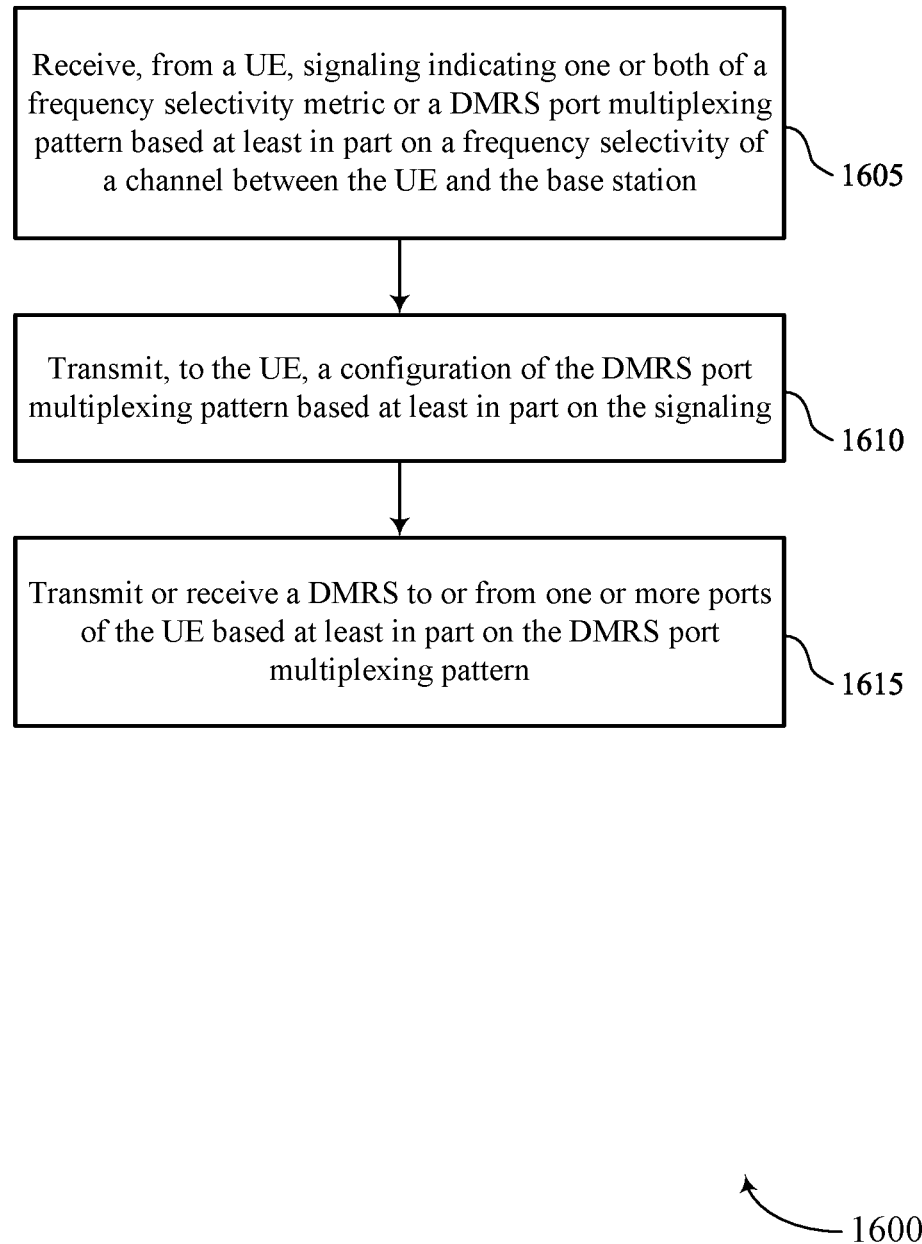

FIG. 16 shows a flowchart illustrating a method 1600 that supports techniques for providing UE-assistance for a selection of a DMRS port multiplexing pattern in accordance with aspects of the present disclosure. The operations of the method 1600 may be implemented by a base station or its components as described herein. For example, the operations of the method 1600 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1605, the method may include receiving, from a UE, signaling indicating one or both of a frequency selectivity metric or a DMRS port multiplexing pattern based at least in part on a frequency selectivity of a channel between the UE and the base station. The operations of 1605 may be performed in accordance with examples as disclosed herein. In some examples, aspects of the operations of 1605 may be performed by a frequency selectivity reporting component 1325 as described with reference to FIG. 13.

At 1610, the method may include transmitting, to the UE, a configuration of the DMRS port multiplexing pattern based at least in part on the signaling. The operations of 1610 may be performed in accordance with examples as disclosed herein. In some examples, aspects of the operations of 1610 may be performed by a DMRS configuration component 1330 as described with reference to FIG. 13.

At 1615, the method may include transmitting or receiving a DMRS to or from one or more ports of the UE based at least in part on the DMRS port multiplexing pattern. The operations of 1615 may be performed in accordance with examples as disclosed herein. In some examples, aspects of the operations of 1615 may be performed by a DMRS component 1335 as described with reference to FIG. 13.

The following provides an overview of aspects of the present disclosure:

Aspect 1: A method for wireless communication at a UE, comprising: measuring a frequency selectivity of a channel between the UE and a base station; transmitting, to the base station, signaling indicating one or both of a frequency selectivity metric or a DMRS port multiplexing pattern based at least in part on the frequency selectivity of the channel; and receiving, from the base station, a configuration of the DMRS port multiplexing pattern based at least in part on the signaling.

Aspect 2: The method of aspect 1, wherein transmitting the signaling indicating one or both of the frequency selectivity metric or the DMRS port multiplexing pattern comprises: transmitting a CSI report comprising an indication of one or both of the frequency selectivity metric or the DMRS port multiplexing pattern.

Aspect 3: The method of aspect 2, wherein the CSI report comprises a bit indicating one of a presence or an absence of CDM in the DMRS port multiplexing pattern.

Aspect 4: The method of any of aspects 1 through 3, wherein transmitting the signaling indicating one or both of the frequency selectivity metric or the DMRS port multiplexing pattern comprises: transmitting one or more of UCI, a MAC-CE, or an RRC information element associated with UE assistance information comprising an indication of one or both of the frequency selectivity metric or the DMRS port multiplexing pattern.

Aspect 5: The method of any of aspects 1 through 4, wherein transmitting the signaling indicating one or both of the frequency selectivity metric or the DMRS port multiplexing pattern comprises: transmitting a HARQ feedback message indicating one or both of the frequency selectivity metric or the DMRS port multiplexing pattern.

Aspect 6: The method of any of aspects 1 through 5, wherein transmitting the signaling indicating one or both of the frequency selectivity metric or the DMRS port multiplexing pattern comprises: transmitting an SRS indicating one or both of the frequency selectivity metric or the DMRS port multiplexing pattern.

Aspect 7: The method of any of aspects 1 through 6, wherein receiving the configuration of the DMRS port multiplexing pattern comprises: receiving DCI scheduling one or more ports of the UE for a DMRS and indicating whether the one or more ports of the UE are code division multiplexed with a second one or more ports of a second UE.

Aspect 8: The method of any of aspects 1 through 7, wherein the frequency selectivity of the channel satisfies a threshold, and wherein transmitting the signaling indicating one or both of the frequency selectivity metric or the DMRS port multiplexing pattern comprises: transmitting an indication of a first DMRS port multiplexing pattern associated with an absence of CDM based at least in part on the frequency selectivity satisfying the threshold.

Aspect 9: The method of aspect 8, further comprising: transmitting or receiving a DMRS across one or more ports of the UE based at least in part on the first DMRS port multiplexing pattern associated with the absence of CDM.

Aspect 10: The method of any of aspects 1 through 7, wherein the frequency selectivity of the channel fails to satisfy a threshold, and wherein transmitting the signaling indicating one or both of the frequency selectivity metric or the DMRS port multiplexing pattern comprises: transmitting an indication of a second DMRS port multiplexing pattern associated with CDM based at least in part on the frequency selectivity failing to satisfy the threshold.

Aspect 11: The method of aspect 10, further comprising: transmitting or receiving a DMRS across one or more ports of the UE based at least in part on the second DMRS port multiplexing pattern associated with the CDM.

Aspect 12: The method of any of aspects 1 through 11, wherein measuring the frequency selectivity of the channel between the UE and the base station comprises: receiving, from the base station, one or both of an SSB or a TRS; and measuring the frequency selectivity based at least in part on one or both of the SSB or TRS.

Aspect 13: The method of any of aspects 1 through 12, wherein the frequency selectivity metric comprises an RMS delay spread and the DMRS port multiplexing pattern comprises a subset of a set of indices of a table of DMRS port multiplexing patterns.

Aspect 14: The method of any of aspects 1 through 13, wherein receiving the configuration of the demodulation reference signal port multiplexing pattern comprises: receiving configuration signaling associated with one or more ports of the UE used for a DMRS and indicating whether the one or more ports of the UE are code division multiplexed with a second one or more ports of a second UE.

Aspect 15: A method for wireless communication at a base station, comprising: receiving, from a UE, signaling indicating one or both of a frequency selectivity metric or a DMRS port multiplexing pattern based at least in part on a frequency selectivity of a channel between the UE and the base station; transmitting, to the UE, a configuration of the DMRS port multiplexing pattern based at least in part on the signaling; and transmitting or receiving a DMRS to or from one or more ports of the UE based at least in part on the DMRS port multiplexing pattern.

Aspect 16: The method of aspect 15, wherein receiving the signaling indicating one or both of the frequency selectivity metric or the DMRS port multiplexing pattern comprises: receiving a CSI report comprising an indication of one or both of the frequency selectivity metric or the DMRS port multiplexing pattern.

Aspect 17: The method of aspect 16, wherein the CSI report comprises a bit indicating one of a presence or an absence of CDM in the DMRS port multiplexing pattern.

Aspect 18: The method of any of aspects 15 through 17, wherein receiving the signaling indicating one or both of the frequency selectivity metric or the DMRS port multiplexing pattern comprises: receiving one or more of UCI, a MAC-CE, or an RRC information element associated with UE assistance information comprising an indication of one or both of the frequency selectivity metric or the DMRS port multiplexing pattern.

Aspect 19: The method of any of aspects 15 through 18, wherein receiving the signaling indicating one or both of the frequency selectivity metric or the DMRS port multiplexing pattern comprises: receiving a HARQ feedback message; and selecting the DMRS port multiplexing pattern based at least in part on the HARQ feedback message.

Aspect 20: The method of any of aspects 15 through 19, wherein receiving the signaling indicating one or both of the frequency selectivity metric or the DMRS port multiplexing pattern comprises: receiving an SRS; measuring the frequency selectivity based at least in part on the SRS; and selecting the DMRS port multiplexing pattern based at least in part on the frequency selectivity.

Aspect 21: The method of any of aspects 15 through 20, wherein transmitting the configuration of the DMRS port multiplexing pattern comprises: transmitting DCI scheduling one or more ports of the UE for the DMRS and indicating whether the one or more ports of the UE are code division multiplexed with a second one or more ports of a second UE.

Aspect 22: The method of any of aspects 15 through 21, wherein the frequency selectivity of the channel satisfies a threshold, and wherein receiving the signaling indicating one or both of the frequency selectivity metric or the DMRS port multiplexing pattern comprises: receiving an indication of a first DMRS port multiplexing pattern associated with an absence of CDM based at least in part on the frequency selectivity satisfying the threshold.

Aspect 23: The method of aspect 22, wherein transmitting or receiving the DMRS to the one or more ports of the UE based at least in part on the DMRS port multiplexing pattern comprises: transmitting or receiving the DMRS to the one or more ports of the UE based at least in part on the first DMRS port multiplexing pattern associated with the absence of CDM.

Aspect 24: The method of any of aspects 15 through 21, wherein the frequency selectivity of the channel fails to satisfy a threshold, and wherein receiving the signaling indicating one or both of the frequency selectivity metric or the DMRS port multiplexing pattern comprises: receiving an indication of a second DMRS port multiplexing pattern associated with CDM based at least in part on the frequency selectivity failing to satisfy the threshold.

Aspect 25: The method of aspect 24, wherein transmitting or receiving the DMRS to the one or more ports of the UE based at least in part on the DMRS port multiplexing pattern comprises: transmitting or receiving the DMRS to the one or more ports of the UE based at least in part on the second DMRS port multiplexing pattern associated with the CDM.

Aspect 26: The method of any of aspects 15 through 25, further comprising: transmitting, to the UE, one or both of an SSB or a TRS, wherein receiving the signaling indicating one or both of the frequency selectivity metric or the DMRS port multiplexing pattern is based at least in part on transmitting one or both of the SSB or the TRS.

Aspect 27: The method of any of aspects 15 through 26, wherein the frequency selectivity metric comprises an RMS delay spread and the DMRS port multiplexing pattern comprises a subset of a set of indices of a table of DMRS port multiplexing patterns.

Aspect 28: The method of any of aspects 15 through 27, wherein transmitting the configuration of the demodulation reference signal port multiplexing pattern comprises: transmitting configuration signaling associated with the one or more ports of the UE used for the DMRS and indicating whether the one or more ports of the UE are code division multiplexed with a second one or more ports of a second UE.

Aspect 29: An apparatus for wireless communication at a UE, comprising a processor; memory coupled with the processor; and instructions stored in the memory and executable by the processor to cause the apparatus to perform a method of any of aspects 1 through 14.

Aspect 30: An apparatus for wireless communication at a UE, comprising at least one means for performing a method of any of aspects 1 through 14.

Aspect 31: A non-transitory computer-readable medium storing code for wireless communication at a UE, the code comprising instructions executable by a processor to perform a method of any of aspects 1 through 14.

Aspect 32: An apparatus for wireless communication at a base station, comprising a processor; memory coupled with the processor; and instructions stored in the memory and executable by the processor to cause the apparatus to perform a method of any of aspects 15 through 28.

Aspect 33: An apparatus for wireless communication at a base station, comprising at least one means for performing a method of any of aspects 15 through 28.

Aspect 34: A non-transitory computer-readable medium storing code for wireless communication at a base station, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   at least one processor; and
   memory coupled to the at least one processor, the memory storing instructions executable by the at least one processor to cause the apparatus to:
   measure a frequency selectivity of a channel between the UE and a network device;
   transmit, to the network device, signaling indicating one or both of a frequency selectivity metric based at least in part on the frequency selectivity of the channel or a demodulation reference signal port multiplexing pattern based at least in part on the frequency selectivity of the channel; and receive, from the network device, a configuration of the demodulation reference signal port multiplexing pattern, wherein the configuration indicates whether the demodulation reference signal port multiplexing pattern is associated with code division multiplexing based at least in part on the signaling.

2. The apparatus of claim 1, wherein the instructions to receive the configuration of the demodulation reference signal port multiplexing pattern are executable by the at least one processor to cause the apparatus to:

receive configuration signaling associated with one or more ports of the UE used for a demodulation reference signal and indicating whether the one or more ports of the UE are code division multiplexed with a second one or more ports of a second UE.

3. The apparatus of claim 1, wherein the instructions to transmit the signaling indicating one or both of the frequency selectivity metric or the demodulation reference signal port multiplexing pattern are executable by the at least one processor to cause the apparatus to:

transmit a channel state information report comprising an indication of one or both of the frequency selectivity metric or the demodulation reference signal port multiplexing pattern.

4. The apparatus of claim 3, wherein the channel state information report comprises a bit indicating one of a presence or an absence of the code division multiplexing associated with the demodulation reference signal port multiplexing pattern.

5. The apparatus of claim 1, wherein the instructions to transmit the signaling indicating one or both of the frequency selectivity metric or the demodulation reference signal port multiplexing pattern are executable by the at least one processor to cause the apparatus to:

transmit one or more of uplink control information, a medium access control (MAC) control element, or a radio resource control information element associated with UE assistance information comprising an indication of one or both of the frequency selectivity metric or the demodulation reference signal port multiplexing pattern.

6. The apparatus of claim 1, wherein the instructions to transmit the signaling indicating one or both of the frequency selectivity metric or the demodulation reference signal port multiplexing pattern are executable by the at least one processor to cause the apparatus to:

transmit a hybrid automatic repeat request feedback message indicating one or both of the frequency selectivity metric or the demodulation reference signal port multiplexing pattern.

7. The apparatus of claim 1, wherein the instructions to transmit the signaling indicating one or both of the frequency selectivity metric or the demodulation reference signal port multiplexing pattern are executable by the at least one processor to cause the apparatus to:

transmit a sounding reference signal indicating one or both of the frequency selectivity metric or the demodulation reference signal port multiplexing pattern.

8. The apparatus of claim 1, wherein the instructions to measure the frequency selectivity of the channel between the UE and the network device are executable by the at least one processor to cause the apparatus to:

receive, from the network device, one or both of a synchronization signal block or a tracking reference signal; and measure the frequency selectivity based at least in part on one or both of the synchronization signal block or the tracking reference signal.

9. The apparatus of claim 1, wherein the frequency selectivity metric comprises a root mean square delay spread and the demodulation reference signal port multiplexing pattern comprises a subset of a set of indices of a table of demodulation reference signal port multiplexing patterns.

10. The apparatus of claim 1, wherein the demodulation reference signal port multiplexing pattern is associated with:

an absence of the code division multiplexing based at least in part on the frequency selectivity satisfying a threshold; or the code division multiplexing based at least in part on the frequency selectivity failing to satisfy the threshold.

11. The apparatus of claim 10, wherein the frequency selectivity satisfies the threshold, and wherein the instructions are further executable by the at least one processor to cause the apparatus to:

transmit or receive a demodulation reference signal across one or more ports of the UE based at least in part on the demodulation reference signal port multiplexing pattern associated with the absence of the code division multiplexing.

12. The apparatus of claim 10, wherein the frequency selectivity fails to satisfy the threshold, and wherein the instructions are further executable by the at least one processor to cause the apparatus to:

transmit or receive a demodulation reference signal across one or more ports of the UE based at least in part on the demodulation reference signal port multiplexing pattern associated with the code division multiplexing.

13. An apparatus for wireless communication at a network device, comprising:

at least one processor; and memory coupled with the at least one processor, the memory storing instructions executable by the at least one processor to cause the apparatus to:

receive, from a user equipment (UE), signaling indicating one or both of a frequency selectivity metric based at least in part on a frequency selectivity of a channel between the UE and the network device or a demodulation reference signal port multiplexing pattern based at least in part on the frequency selectivity of the channel between the UE and the network device;

transmit, to the UE, a configuration of the demodulation reference signal port multiplexing pattern, wherein the configuration indicates whether the demodulation reference signal port multiplexing pattern is associated with code division multiplexing based at least in part on the signaling; and transmit or receive a demodulation reference signal to or from one or more ports of the UE based at least in part on the demodulation reference signal port multiplexing pattern.

14. The apparatus of claim 13, wherein the instructions to transmit the configuration of the demodulation reference signal port multiplexing pattern are executable by the at least one processor to cause the apparatus to:

transmit configuration signaling associated with the one or more ports of the UE used for the demodulation reference signal and indicating whether the one or more ports of the UE are code division multiplexed with a second one or more ports of a second UE.

15. The apparatus of claim 13, wherein the instructions to receive the signaling indicating one or both of the frequency selectivity metric or the demodulation reference signal port multiplexing pattern are executable by the at least one processor to cause the apparatus to:
receive a channel state information report comprising an indication of one or both of the frequency selectivity metric or the demodulation reference signal port multiplexing pattern.

16. The apparatus of claim 15, wherein the channel state information report comprises a bit indicating one of a presence or an absence of the code division multiplexing associated with the demodulation reference signal port multiplexing pattern.

17. The apparatus of claim 13, wherein the instructions to receive the signaling indicating one or both of the frequency selectivity metric or the demodulation reference signal port multiplexing pattern are executable by the at least one processor to cause the apparatus to:
receive one or more of uplink control information, a medium access control (MAC) control element, or a radio resource control information element associated with UE assistance information comprising an indication of one or both of the frequency selectivity metric or the demodulation reference signal port multiplexing pattern.

18. The apparatus of claim 13, wherein the instructions to receive the signaling indicating one or both of the frequency selectivity metric or the demodulation reference signal port multiplexing pattern are executable by the at least one processor to cause the apparatus to:
receive a hybrid automatic repeat request feedback message; and
select the demodulation reference signal port multiplexing pattern based at least in part on the hybrid automatic repeat request feedback message.

19. The apparatus of claim 13, wherein the instructions to receive the signaling indicating one or both of the frequency selectivity metric or the demodulation reference signal port multiplexing pattern are executable by the at least one processor to cause the apparatus to:
receive a sounding reference signal;
measure the frequency selectivity based at least in part on the sounding reference signal; and
select the demodulation reference signal port multiplexing pattern based at least in part on the frequency selectivity.

20. The apparatus of claim 13, wherein the instructions are further executable by the at least one processor to cause the apparatus to:
transmit, to the UE, one or both of a synchronization signal block or a tracking reference signal, wherein receiving the signaling indicating one or both of the frequency selectivity metric or the demodulation reference signal port multiplexing pattern is based at least in part on transmitting one or both of the synchronization signal block or the tracking reference signal.

21. The apparatus of claim 13, wherein the frequency selectivity metric comprises a root mean square delay spread and the demodulation reference signal port multiplexing pattern comprises a subset of a set of indices of a table of demodulation reference signal port multiplexing patterns.

22. The apparatus of claim 13, wherein the demodulation reference signal port multiplexing pattern is associated with:
an absence of the code division multiplexing based at least in part on the frequency selectivity satisfying a threshold; or
the code division multiplexing based at least in part on the frequency selectivity failing to satisfy the threshold.

23. The apparatus of claim 22, wherein the frequency selectivity satisfies the threshold, and wherein the instructions to transmit or receive the demodulation reference signal to or from the one or more ports of the UE based at least in part on the demodulation reference signal port multiplexing pattern are executable by the at least one processor to cause the apparatus to:
transmit or receive the demodulation reference signal to or from the one or more ports of the UE based at least in part on the demodulation reference signal port multiplexing pattern associated with the absence of the code division multiplexing.

24. The apparatus of claim 22, wherein the frequency selectivity fails to satisfy the threshold, and wherein the instructions to transmit or receive the demodulation reference signal to or from the one or more ports of the UE based at least in part on the demodulation reference signal port multiplexing pattern are executable by the at least one processor to cause the apparatus to:
transmit or receive the demodulation reference signal to or from the one or more ports of the UE based at least in part on the demodulation reference signal port multiplexing pattern associated with the code division multiplexing.

25. A method for wireless communication at a user equipment (UE), comprising:
measuring a frequency selectivity of a channel between the UE and a network device;
transmitting, to the network device, signaling indicating one or both of a frequency selectivity metric based at least in part on the frequency selectivity of the channel or a demodulation reference signal port multiplexing pattern based at least in part on the frequency selectivity of the channel; and
receiving, from the network device, a configuration of the demodulation reference signal port multiplexing pattern, wherein the configuration indicates whether the demodulation reference signal port multiplexing pattern is associated with code division multiplexing based at least in part on the signaling.

26. The method of claim 25, wherein receiving the configuration of the demodulation reference signal port multiplexing pattern comprises:
receiving configuration signaling associated with one or more ports of the UE used for a demodulation reference signal and indicating whether the one or more ports of the UE are code division multiplexed with a second one or more ports of a second UE.

27. A method for wireless communication at a network device, comprising:
receiving, from a user equipment (UE), signaling indicating one or both of a frequency selectivity metric based at least in part on a frequency selectivity of a channel between the UE and the network device or a demodulation reference signal port multiplexing pattern based at least in part on the frequency selectivity of the channel between the UE and the network device;
transmitting, to the UE, a configuration of the demodulation reference signal port multiplexing pattern, wherein the configuration indicates whether the demodulation reference signal port multiplexing pattern is associated with code division multiplexing based at least in part on the signaling; and transmitting or receiving a demodulation reference signal to or from one or more ports of the UE based at least in part on the demodulation reference signal port multiplexing pattern.

28. The method of claim 27, wherein transmitting the configuration of the demodulation reference signal port multiplexing pattern comprises:

transmitting configuration signaling associated with the one or more ports of the UE used for the demodulation reference signal and indicating whether the one or more ports of the UE are code division multiplexed with a second one or more ports of a second UE.

* * * * *